United States Patent
Kavipurapu

[19]

[11] Patent Number: 6,009,488
[45] Date of Patent: Dec. 28, 1999

[54] COMPUTER HAVING PACKET-BASED INTERCONNECT CHANNEL

[75] Inventor: Gautam Kavipurapu, Dallas, Tex.

[73] Assignee: Microlinc, LLC, Tex.

[21] Appl. No.: 08/965,760

[22] Filed: Nov. 7, 1997

[51] Int. Cl.⁶ .................................................. G06F 13/00
[52] U.S. Cl. .................. 710/105; 710/129; 710/240; 710/29; 710/30; 710/36; 710/3
[58] Field of Search ................... 710/3–7, 29–39, 710/105–127, 129–130, 240

[56] References Cited

U.S. PATENT DOCUMENTS

| | | | |
|---|---|---|---|
| 4,777,595 | 10/1988 | Strecker et al. | 395/200.66 |
| 5,191,657 | 3/1993 | Ludwig et al. | 395/325 |
| 5,390,308 | 2/1995 | Ware et al. | 395/400 |
| 5,499,385 | 3/1996 | Farmwald et al. | 395/823 |
| 5,555,381 | 9/1996 | Ludwig et al. | 395/281 |
| 5,598,580 | 1/1997 | Detschel et al. | 395/855 |
| 5,606,717 | 2/1997 | Farmwald et al. | 395/856 |
| 5,646,941 | 7/1997 | Nishimura et al. | 370/389 |
| 5,809,263 | 9/1998 | Farmwald et al. | 395/309 |
| 5,872,996 | 2/1999 | Barth et al. | 395/853 |

*Primary Examiner*—Christopher B. Shin
*Attorney, Agent, or Firm*—Lockwood, Alex, FitzGibbon & Cummings

[57] ABSTRACT

A physically non-distributed microprocessor-based computer includes a microprocessor, and a random access memory device, a mass storage device, and an input-output port device, all operable from the microprocessor and including an interface for receiving and transmitting data in packet form. A novel packet-based data channel extends between the microprocessor and the interfaces of the devices to provide communication between the microprocessor and the devices. By varying the size of the packets in accordance with actual data transmission requirements improved computer performance is achieved.

13 Claims, 21 Drawing Sheets

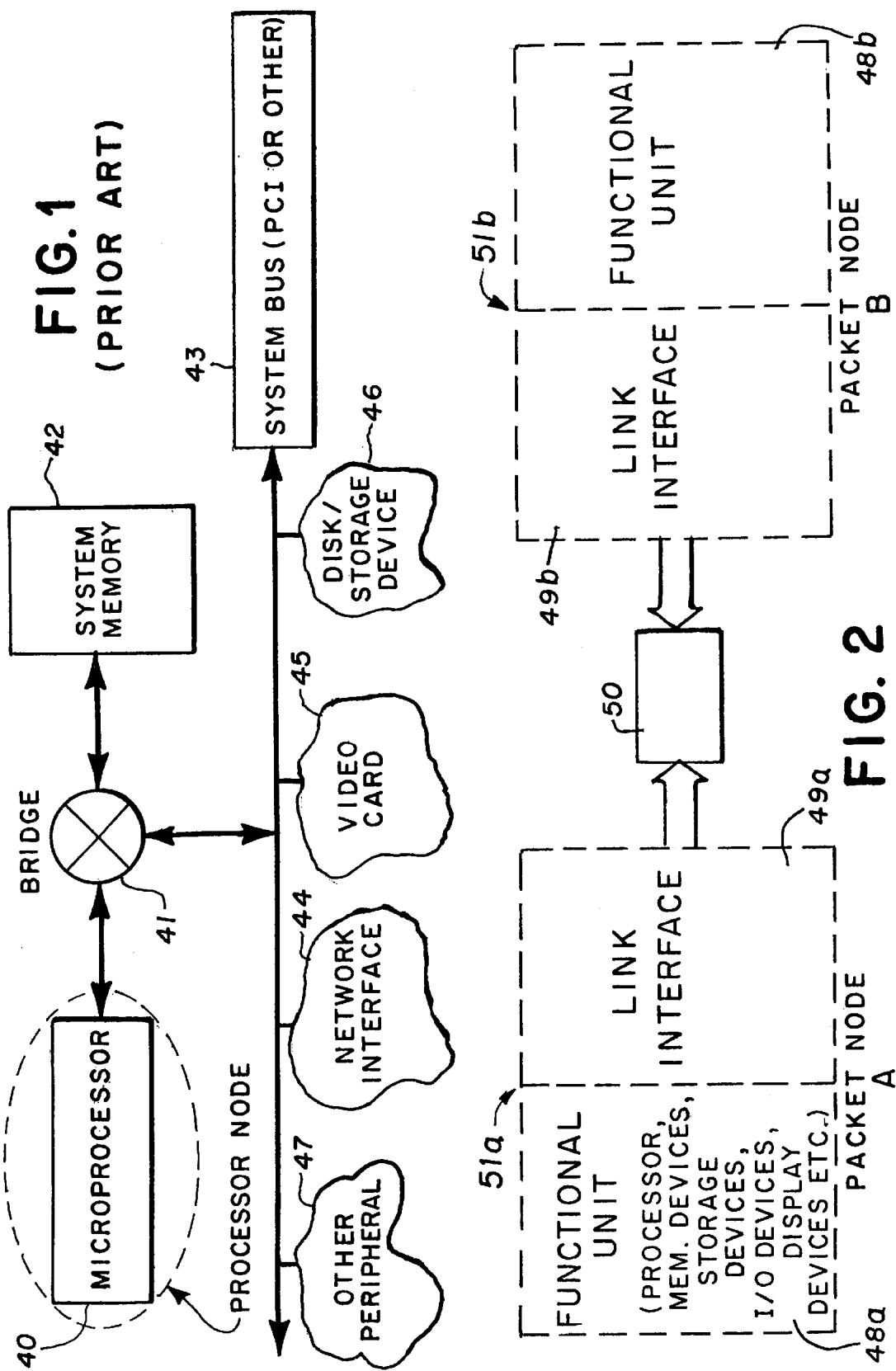

WIDTH = 2 BYTES
SIZE = 2 BYTES TO A MAXIMUM OF 258 BYTES

IDLE PACKET

SIZE: MIN. 2 BYTES
NO DATA

REQUEST PACKET

MIN. SIZE: 4 BYTES
MAX. SIZE: 258 BYTES

REQUEST ECHO PACKET

MIN. SIZE: 2 BYTES
NO DATA OR BODY

RESPONSE PACKET

MIN. SIZE: 4 BYTES
MAX. SIZE: 258 BYTES

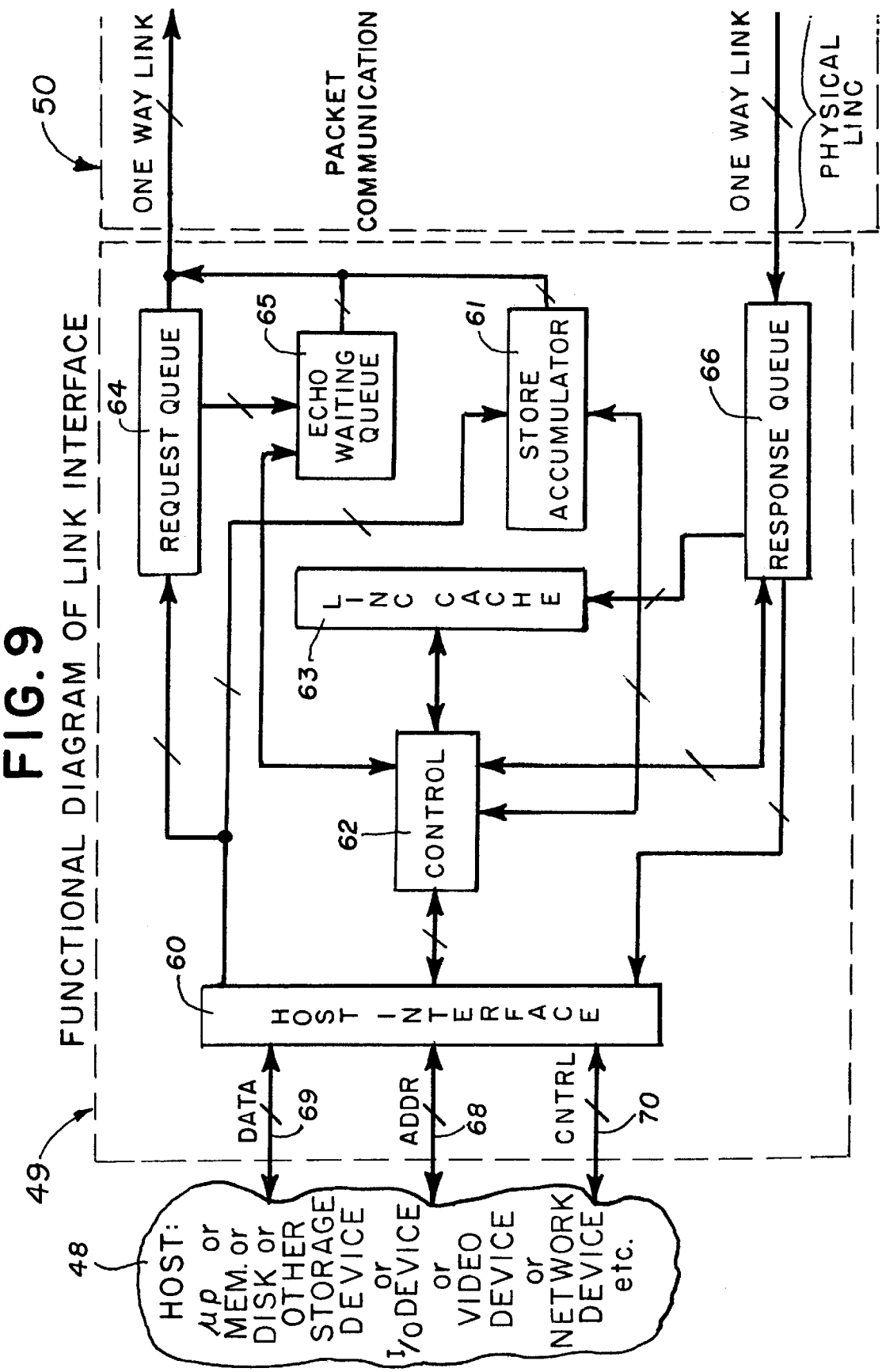

FIG.10a

POSSIBLE REQUEST QUEUE STRUCTURES

WIDTH = 2 BYTES + 1 BIT FOR FRAME (67)

DEPTH = n × MAXIMUM PACKET SIZE (258 BYTES) n=1,2,3...

FIG.10b

WIDTH = NECESSARY WIDTH
ie FUNCTIONAL UNIT ADDR. + FUNCTIONAL UNIT DATA + FUNCTIONAL UNIT CNTR

OPTION: 1 FIG. 13a
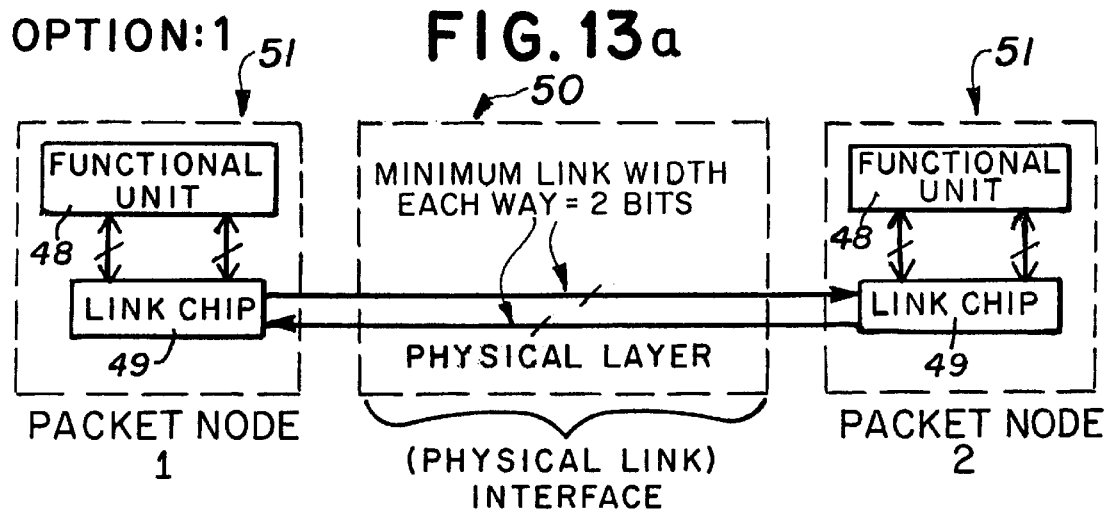
A SAMPLE TWO NODE LINK WHERE NODE 1 FUNCTIONAL UNIT IS THE PROCESSOR AND NODE 2 FUNCTIONAL UNIT IS THE MEMORY.
OPTION: 2 FIG. 13b
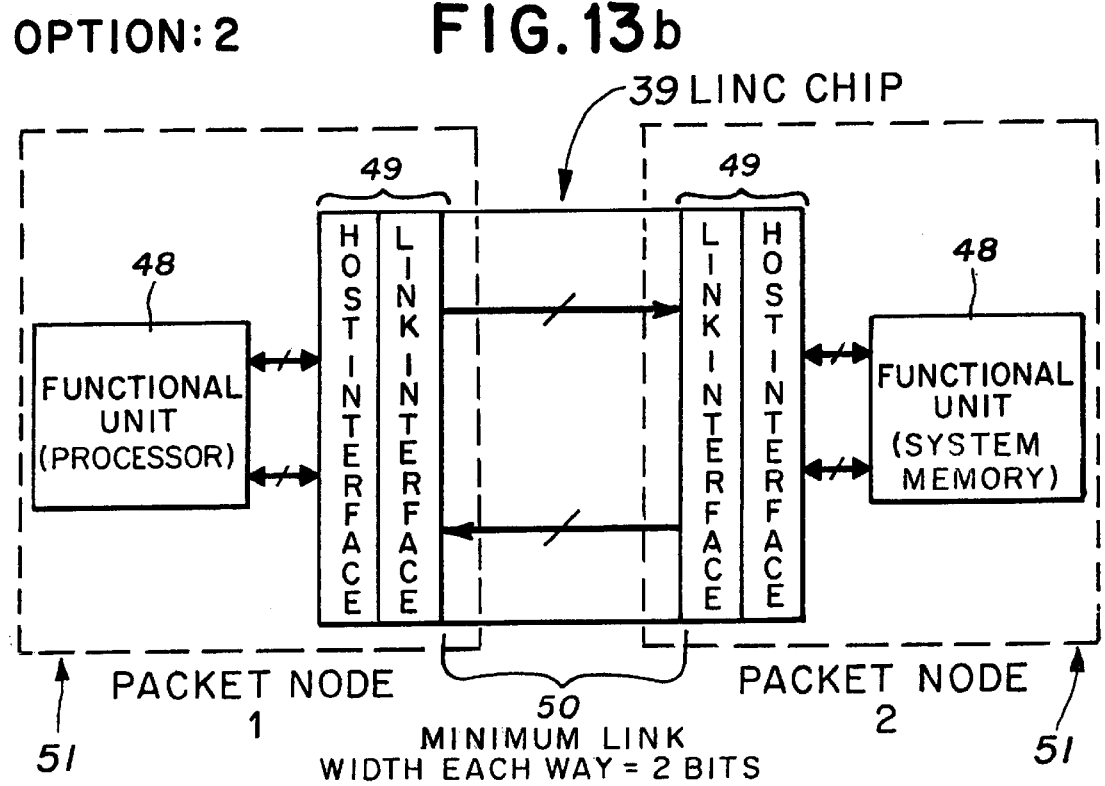

FIG. 18
RESPONSE PACKET
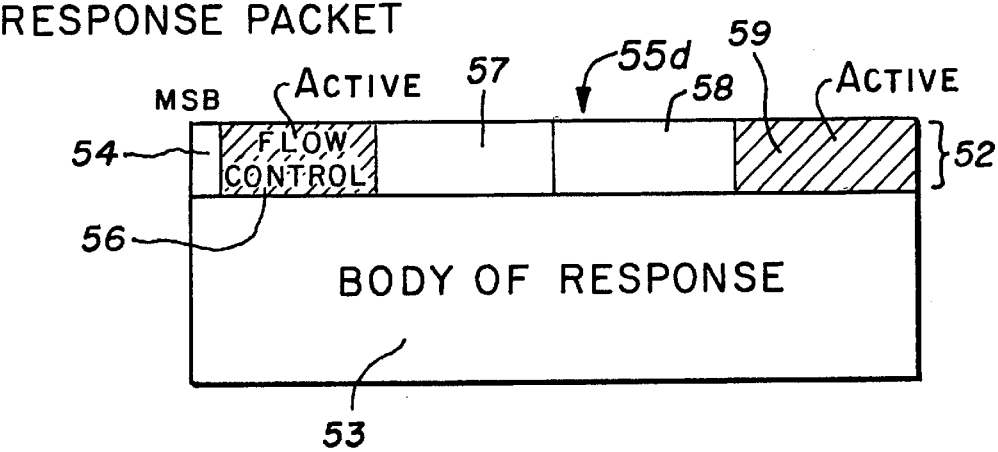
FIG. 19
REQUEST PACKET FOR A LOAD
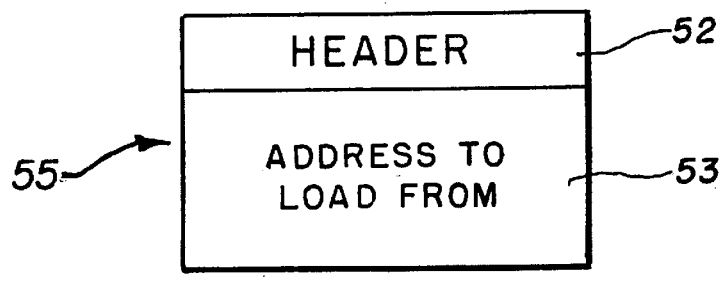
REQUEST PACKET FOR A STORE
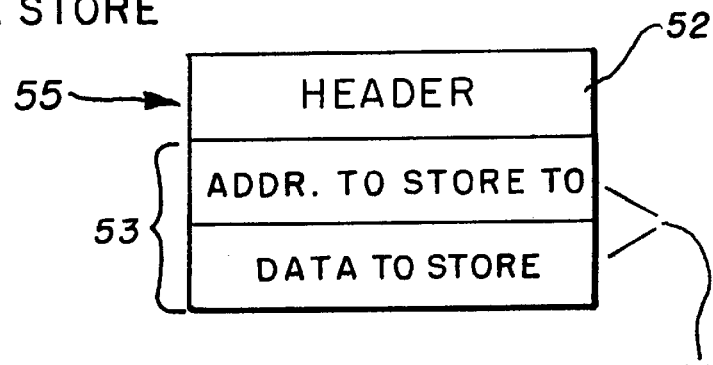
K OF EACH WHERE K IS THE NUMBER OF STORES IN THE STORE ACCUMULATOR.

HOST CHIP TRANSMIT HALF

RECEIVE HALF HOST CHIP

MEMORY CHIP TRANSMIT HALF

FIG. 26
POSSIBLE RESPONSE PACKETS FOR A REQUEST WHEN ACCESS TO TLB AND OR BTB IN THE PROCESSOR IS AVAILABLE
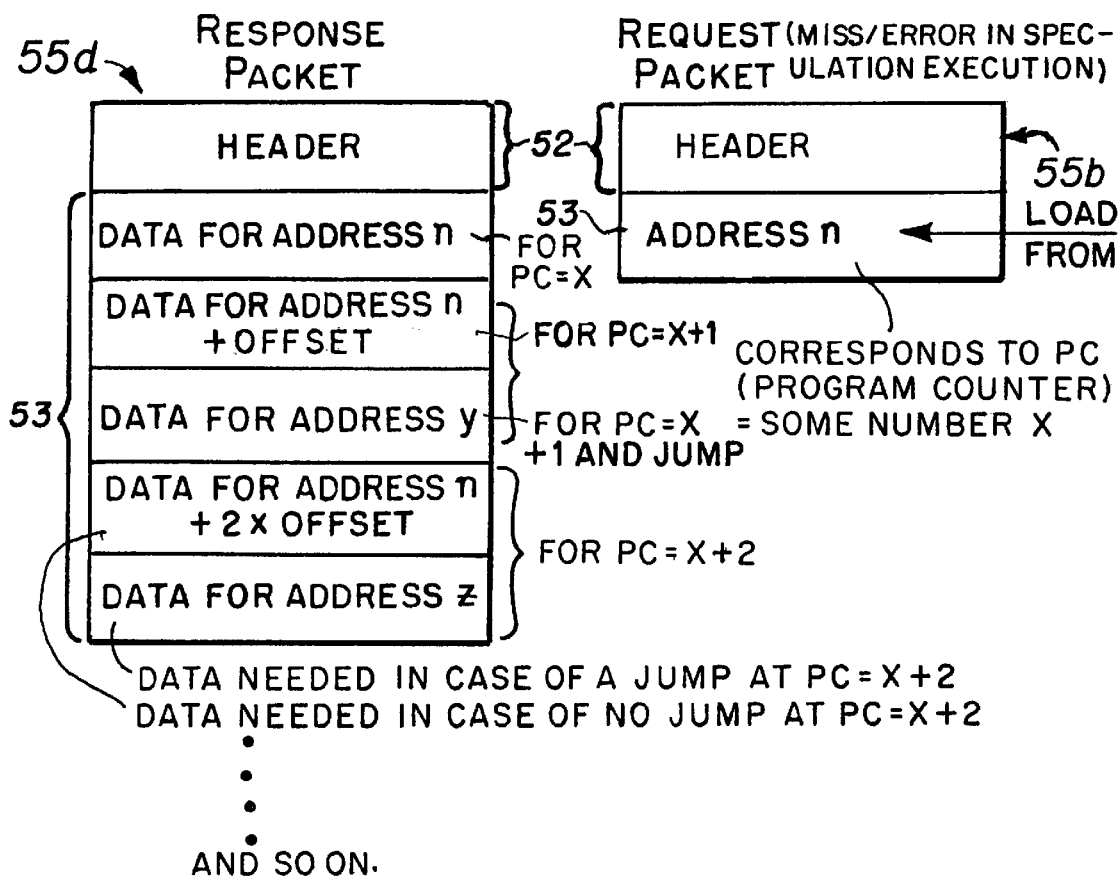
FOR PROGRAMS WITH VERY HIGH LOCALITY (GRAPHICS, MULTIMEDIA ETC.)
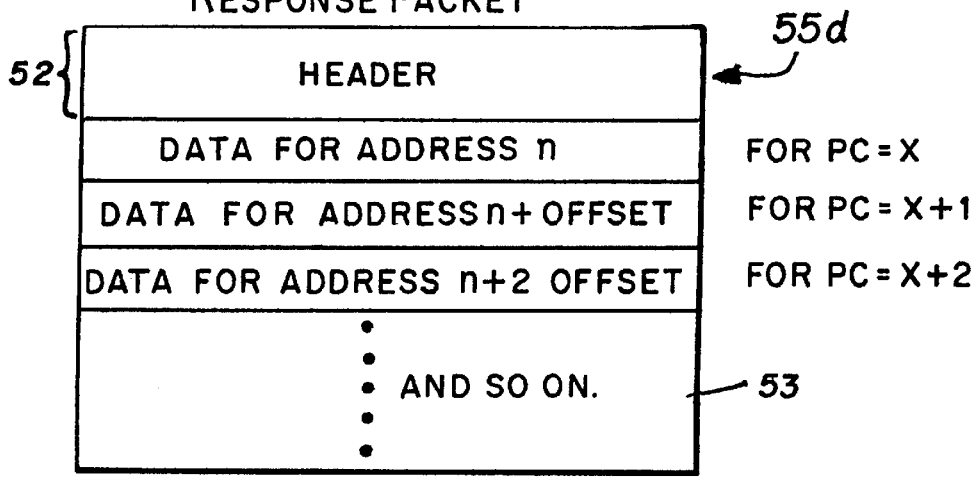

PROCESSOR NODE RECEIVE PROTOCOL

FOR PRESENT DETAILED IMPLEMENTATION, THE MEMORY NODE IS EXPECTED TO SEND ONLY THE FOLLOWING PACKETS.

*LINE HERE INDICATES ONE PROCESSOR REQUESTED WORD

MEMORY NODE RECEIVE PROTOCOL

MEMORY NODE TRANSMIT PROTOCOL

COMPUTER HAVING PACKET-BASED INTERCONNECT CHANNEL

BACKGROUND OF THE INVENTION

This invention relates to physically non-distributed microprocessor based systems and, more particularly, the communication channel between functional components within a class of computer systems commonly known as personal computers.

A personal computer (PC) is comprised of several major functional components which may be basically defined as a microprocessor, a read/write memory (RAM), a mass storage device (e.g., hard drive or CD ROM), and an input/output (I/O) device (e.g., display, serial port, parallel ports, etc.). These functional components within the PC are interconnected by, and communicate via, a parallel data/address bus which is usually as wide as the processor data I/O path. The bus is typically of fixed physical length comprising a number of parallel copper traces on the PC's motherboard. In addition, there are provided a number of fixed tap points to the bus, e.g., edge connectors, din connectors, etc., to allow the customization of the PC's configuration by adding peripheral functions, memory, etc., or removing unused functionality.

While a bus provides a simple-minded mechanism for customization and communication within a PC, it has several limitations and unique problems associated with it. First, a bus is by nature, single transaction (e.g., only one functional unit can communicate with another at any given time and during this time, no other functional units can communicate with anything) and sequential (messages follow one after the other with considerable handshaking between functional units). A second problem of a bus is that all functional units connected to the bus must meet the electrical specifications and requirements of the bus even if these specifications and requirements are quite dated, technologically. Thirdly, because the bus is a generic interconnect in nature, it can not be truly optimized for communication between any specific subset of functional units without adversely affecting communication performance between another subset of functional units.

Fourth, the speed of the bus is substantially slower than might otherwise be obtainable. This is due to two primary issues: First, busses are composed of relatively long lengths of parallel traces in close proximity to one another and this results in high parasitic capacitive coupling between traces of the bus (i.e., electrical noise). This noise increases as the frequency, or speed, of the bus increases. Thus, noise margin requirements restrict the speed (and length) of the bus. The second issue relates to the unknown and highly variable electrical loading of the bus. The speed of the bus is inversely proportional to the capacitive load on the bus. This capacitive load is determined by the number of electrical connectors on the bus and the number of electrical connections to the bus. Since these numbers are variable, designers typically engineer the bus for worst case constraints. That is, the bus is typically slowed down to a rate that would sustain a worst case loading situation even though this may occur in one PC in a thousand.

Other major drawbacks of a bus are the need for electrical handshake signals and its fixed electrical data width (i.e., 8 bits, 16 bits, 32 bits, etc.) Handshake signals typically include READ, WRITE, MEM, I/O, WAIT/READY, etc. These signals are physical and are used to inform and control functional units (i.e., inform of the type of request, and control/synchronize between communicators.) Fixed data width limitations become problematic as chip data path widths exceed the width of the bus. As will be seen herein, defining handshaking and data size at the physical layer is less flexible than would be desired.

With the ever increasing demand for data manipulation in such applications as multimedia or graphics programs, the bottleneck of the bus becomes more acute. There have been many attempts to address and remedy this problem (e.g., VESA, Video local bus, PCI, etc.) but no solution offers greatly improved performance and complete scalability.

The present invention provides a system with the configuration flexibility of a bus-based PC while reducing the electrical problems. Commensurably, interfunctional-unit communication speed and flexibility are greatly enhanced. The present invention applies a point-to-point packetized interconnection structure to facilitate communication between functional units (e.g., processor, memory, disk, I/O, etc.) within a PC.

Because it is point-to-point, the interconnections scheme of the present invention is of relatively fixed electrical load and can, therefore, be optimized for speed. Furthermore, the packet protocol that will be more fully disclosed herein provides a means of eliminating the typical physical layer control signals of a bus and replacing them with link-layer control which is much more flexible.

In order to allow for interconnecting more than two functional units, the present invention may be expanded by any of several interconnect topologies, e.g., switches, rings, etc. Where speed and a high degree of parallel traffic is desired, a switch topology provides the best means, e.g., crossbar switch. If speed is important but parallel traffic patterns are not very common, a shuffle-type switch may make the most sense. In applications that are very cost sensitive, the present invention may also be expanded by means of a ring topology.

As will be made clear in the specific disclosure portion of this document, the packetized point-to-point interconnection scheme of the present invention improves speed and performance at reduced cost and with better noise characteristics (both internal electrical noise and radiated EMI) as compared to the bus interconnect currently employed within a PC.

Therefore, it is an object of the present invention to provide a new and improved PC, specifically, improving internal communication between microprocessor, memory, mass storage, I/O, etc. or any subset of these functional units. It is further an object of the invention to improve communication speed within a PC. It is further an object of the invention to reduce interconnection electrical noise within a PC. It is further and object of the invention to provide a more flexible interconnect means within a PC.

Accordingly, it is a general object of the present invention to provide a new and improved PC, specifically improving internal communication between microprocessor, memory, mass storage, I/O, etc. or any subset of these functional units.

It is a more specific object of the present invention to provide improved communication speed within a PC.

It is a still more specific object of the present invention to reduce interconnection electrical noise within a PC, and to provide a more flexible interconnect means.

SUMMARY OF THE INVENTION

The invention is directed to a physically non-distributed microprocessor-based computer system, comprising a microprocessor, a random access memory device, a mass storage device, an input-output port device, wherein the devices are each being operable in conjunction with the microprocessor and include an interface for receiving and transmitting data in packet form, and which further comprise a packet-based data channel extending between the microprocessor and the interfaces of the devices for providing simultaneous bi-directional communication between the microprocessor and the devices.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 1 is a block diagram of current PC systems which use a bus based interconnect.

FIG. 2 is a conceptual block diagram of two packet nodes and a physical link.

FIG. 9 is a functional block diagram of a link interface showing all the necessary elements.

FIGS. 10a and 10b show the possible structures of a request queue shown in FIG. 9.

FIGS. 13a and 13b show possible implementations of the linc using discrete link interface chips.

FIG. 18 shows detailed structure of a Response packet for processor memory I/O.

FIG. 19 shows sample request packets for a load and store instruction.

FIG. 26 shows possible structures of response packets for a given request in response to conditional branch or jump in program code.

DESCRIPTION OF THE PREFERRED EMBODIMENT

Figure 3:
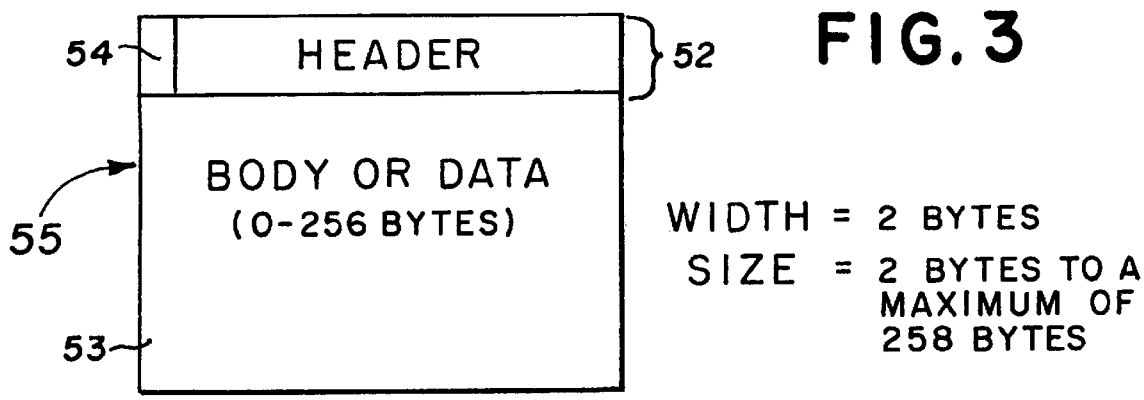
FIG. 3 is a general block diagram of a packet.

With reference to the Figures, and particularly to FIG. 1, a node is defined as any device or group of devices which perform a specific system function within a microprocessor system. Such nodes typically have a physical address or addresses with which they are associated. Examples of such nodes include a processor, a memory, an input/output device, a hard disk, etc. The object of this invention is to interconnect all, or some subset of all, nodes with a high speed message passing packetized interconnection channel.

FIG. 1 depicts the simplest implementation of the prior art. Processor node 40 is connected to bridge node 41. Bridge node 41 is further connected to memory node 42. Bridge node 41 also provides an interface to system bus 43 in order to allow processor node 40 to communicate with peripheral nodes 44, 45, 46 and 47 over the bus.

The high speed message passing packetized interconnect channel and protocol is intended to allow asynchronous communication between any two nodes, so equipped, in any system configuration using packets of data or instructions. FIG. 2 shows a logical conceptualization of a node. The functional unit 48 may be any of the elements of FIG. 1. Interface 49, which is the embodiment of the present invention, provides a seamless interface between functional unit 48 and the physical layer 50. Physical layer 50 connects to any other packet node 51, thereby, in conjunction with interface 49, allowing communication between any group of functional units of FIG. 1.

Thus, the present invention makes each node in a computer microprocessor/microcontroller based system interface with each other using a uniform packed based message passing interface. The invention creates packet nodes which speak the same language electrically and logically. This simplifies communication and minimizes traditional handshaking and overhead. Therefore, significant data-rate speedup may be gained because rather than being pigeonholed into a hardware restricted, single transaction, high overhead interconnect (i.e., a bus), the present invention allows messages of varying length (rather than single transaction) with flexible handshaking, and minimal overhead. Or, more precisely, the present invention allows for more intelligent and flexible information exchange between nodes while requiring only that overhead and handshaking required for a specific transaction. The present invention does not impose, as does a bus, a set of costly rules and formalism that must be adhered to even if it makes no sense for a specific transaction.

Again, with reference to FIG. 1, current systems communicate at the hardware level, i.e., the processor node 40 issues commands on the processor bus which must then be converted from the virtual address that the processor understands to a physical address by bridge 41. This, information is then further converted by bridge 41 prior to being placed on the bus 43. At this point, all other nodes, 42, 44, 45, 46 or 47 on the bus look to see if they are being addressed by processor node 40. The one node that is in fact being addressed, acknowledges the processor query and then takes action based on that query. Upon receiving the acknowledgment from the queried node, processor node 40 now may take appropriate data action (i.e., output data, input data, etc.) and the transaction is assumed to be completed. Next, the process can repeat in exactly the same manner, even if the query is to the exact same node as previously addressed. This is the handshaking and overhead bottleneck of a conventional bus. Furthermore, whenever the bus is being utilized by a pair of nodes, all other nodes are prevented from communicating with any other node. The present invention stems from the realization that the byte by byte handshaking and transmission that is typical of a bus-based system is greatly inefficient and constraining and may be vastly improved upon.

In accordance with the invention packet based message passing techniques are applied to the nodes within a microprocessor based system. With reference to FIG. 2, the following is a simple illustration of the invention's operation: Execution unit 48a (e.g., processor node) requests information from execution unit 48(b) (e.g., memory node) via link interface 49(a). Link interface 49(a) assembles a packet requesting said information (i.e., its address in memory, amount of data requested, etc.) and then rapidly transmits said packet to link interface 49(b) via physical interface 50 (which may be single-ended line drivers, low voltage differential drivers, or any other method common in the art). Link interface 49(b) then decodes the packet and takes the necessary steps to process the request with respect to execution unit 48(b). Link interface 49(b) then collects, from execution unit 48(b), all data necessary to fill the request, packetizes the data into a response, and then, when the request is filled, ships the data back to link interface 49(a) via physical link 50. At this point, link interface 49(a), depacketizes the data and provides it to execution unit 48(a) in a manner befitting the execution unit's request. Thus, the physical link is only tied up for the time when useful information is actually being sent. Furthermore, requests for several pieces of data result in less physical interface bandwidth utilization since the several pieces of data are streamed in the same message.

A packet node in the present invention communicates with another packet node using "packets." Each packet contains all the necessary information that is required for the intended receiver without the added overhead of setting up the receiver or formatting the data to a node-specific set up.

The structure of a packet 55 such as shown in FIG. 3 may have, for example, the following general characteristics:

1) Packet components 52 and 53 are of 16 bits (2 bytes) in width and referred to as a packet word.
2) Header 52 has means for indicating that the next packet word is an extension of the header 52. This means is the extended header bit 54.
3) A packet body 53 which can be anywhere from 0 bytes to 256 bytes in length.
4) The maximum size of a packet 55 is 258 bytes.
5) The width of the packet remains the same regardless of the width of the channel (i.e., for wider channels, more than one packet word may be sent in parallel.)

The above definitions may easily be changed without affecting the nature of the invention.

Figure 4:
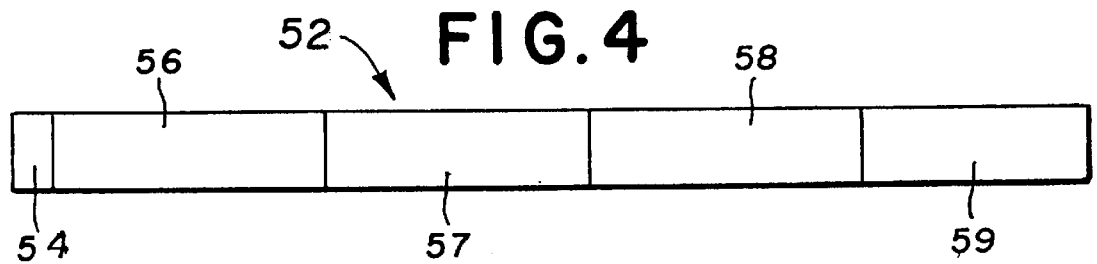
FIG. 4 is a detailed diagram of the packet header showing each of the fields.

FIG. 4 details the fields within the header packet. The type-of-packet field 59 defines one of four fundamental packet types that are exchanged between any two nodes. These are 1) IDLE, 2) REQUEST, 3) REQUEST ECHO, and 4) RESPONSE. The type-of-instruction field 58 indicates the action that needs to be taken by the receiving node of this packet. Examples of such actions include load, store, input, output, read, write, and other system level interfunctional unit operations.

The size-of-device field 57 is to allow for the interface between devices of different physical data widths with minimum physical layer transmission time. By knowing the size of a requesting node device, the interface circuitry of the receiving node can pack the data into a packet in the most efficient manner for decoding by the requesting device and only send portions of the overall required response that are filled, where 'filled' is defined as sufficient to meet the width of the requesting node device as defined in the size-of-device field.

The flow control field 56 contains the size-of-response, node ID, extended header bit, and BUSY/OKAY status bit. The size-of-response indicates the amount of data being requested. The node ID indicates the logical functional unit for which this packet is intended. The extended header bit allows for headers greater than 2 bytes in size, where necessary. The BUSY/OKAY status bit indicates whether the receiver of request packet can accept and service the packet.

Figure 5:
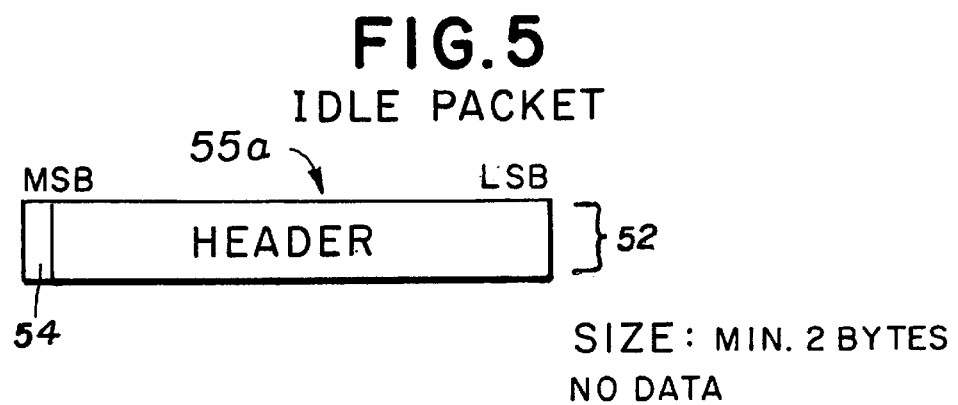
FIG. 5 is a general block diagram of an Idle packet.

Having defined the fields of the header packet, we now define the four fundamental packet types. The IDLE packet 55a, FIG. 5, contains only the header and no data and is continually sent out by the idle node. A node receiving the IDLE packet may then use the idle link for transmitting data that the receiving node believes the idle node may need based on the idle node's prior request history.

It is informative to illustrate the use of IDLE packets with an example. Assume that the processor node has been requesting sequential data blocks from the memory node. At some point in time, the processor node stops requesting data from the memory node because the processor node has to do something else (e.g., service an interrupt). At this point, the processor node sends idle packets to the memory node. Upon reception of the idle packet, the memory node reviews the history of processor node requests and may continue to send data based on a projection of the history of the processor node requests. These unrequested data are then stored in the processor node link interface cache provided the processor node has not specifically requested some data from any other node. In this way, idle links can be used most effectively to transmit data that may be needed before it is requested.

Figure 6:
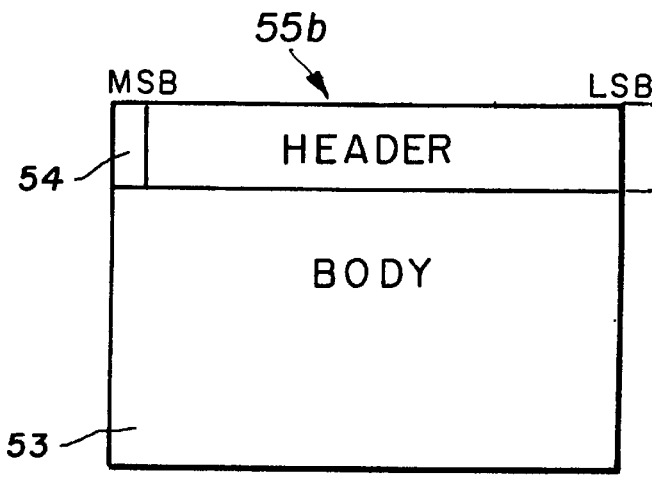
FIG. 6 is a general block diagram of an Request packet.

A second type of packet is the REQUEST packet 55b, FIG. 6, which has been informally referred to throughout this disclosure. This packet is transmitted between any two nodes to indicate or request an action from the receiving node for the requesting node. The request packet contains a header (see FIG. 3, element 52) that has the ID of the requested node in the flow control field and the type of instruction for the receiver to execute, e.g., load, store, etc. The request packet also contains a body (see FIG. 3, element 53) to the extent that there is data sent by the requesting node to the receiving node for the receiver to perform the requested instruction.

Figure 7:
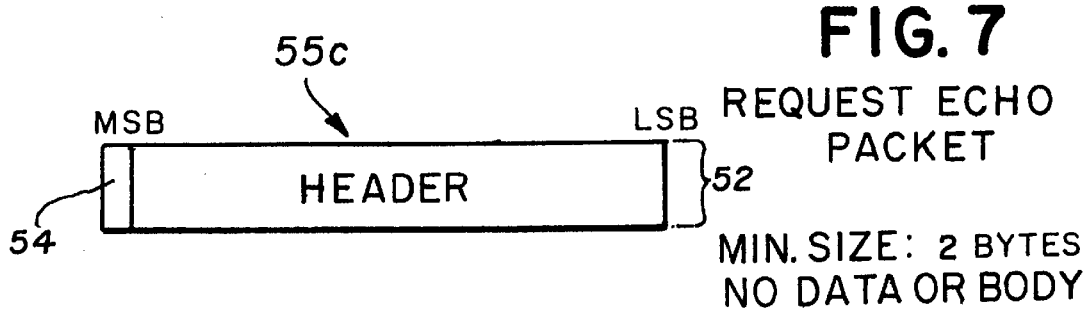
FIG. 7 is a general block diagram of a Request Echo packet.

The REQUEST ECHO packet 55c, FIG. 7, is sent by the receiving node to acknowledge reception of a REQUEST packet 55b. This packet is primarily for indicating whether the request from the requester can be catered or not. Within the header of the request echo packet, in the flow control field, the REQUEST ECHO packet indicate whether the receiver is busy (busy echo) or able to service the request (okay echo).

Figure 8:
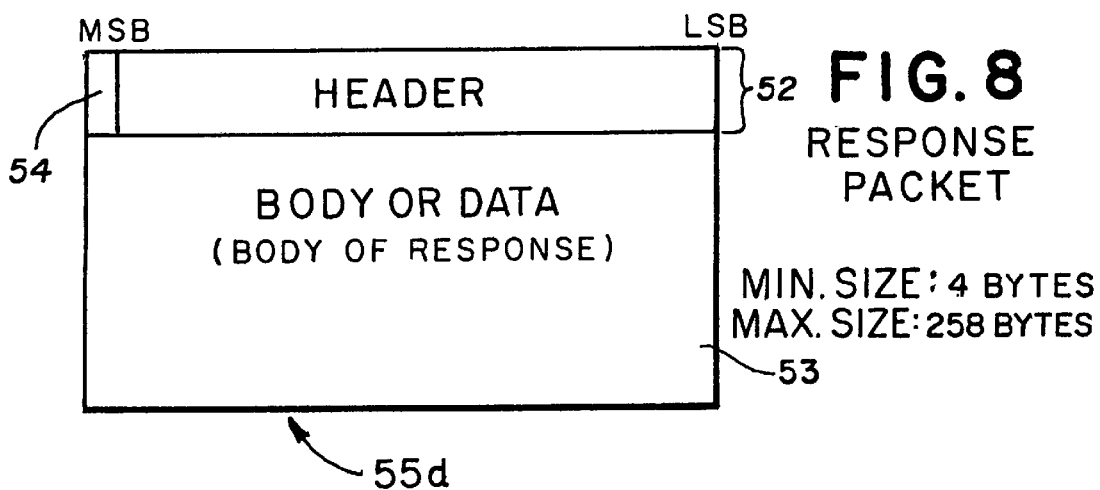
FIG. 8 is a general block diagram of a Response packet.

The last packet type is the RESPONSE packet 55d, FIG. 8. This packet is used to respond to a REQUEST packet. The header of the RESPONSE packet contains the node ID of the intended receiver (i.e., the original requesting node) and other information regarding flow control, etc. The body of the response packet contains the data requested to the extent it is required and the body of the RESPONSE packet is no longer than it needs to be to hold said data.

A typical transaction between any two nodes (node a and node b) shown in FIG. 2 is summarized below:
1. Node A generates a request packet for Node B.
2. Node B, based on whether Node B's request queue can cater to the request, sends one of two messages back.:
   a. If it can cater to request from Node A then sends Node B a REQUEST ECHO OKAY packet.
   b. If it can not cater to a request from Node A then Node B sends a REQUEST ECHO BUSY packet.
3. If Node A receives a REQUEST ECHO OKAY packet then Node A takes no action on the original request. If Node A receives a REQUEST ECHO BUSY packet then Node A resends the original request.
4. If REQUEST ECHO OKAY was sent by Node B, then Node B sends a RESPONSE packet to cater to the original request. This completes the transaction between Node A and Node B.

If no action is required from either Node A by Node B or from Node B by Node A, then IDLE packets are exchanged between them. Node A sending an IDLE packet to Node B or vice a versa are both independent operations. The IDLE packet may also be used to exchange configuration/status/control information of each node.

Figure 24:
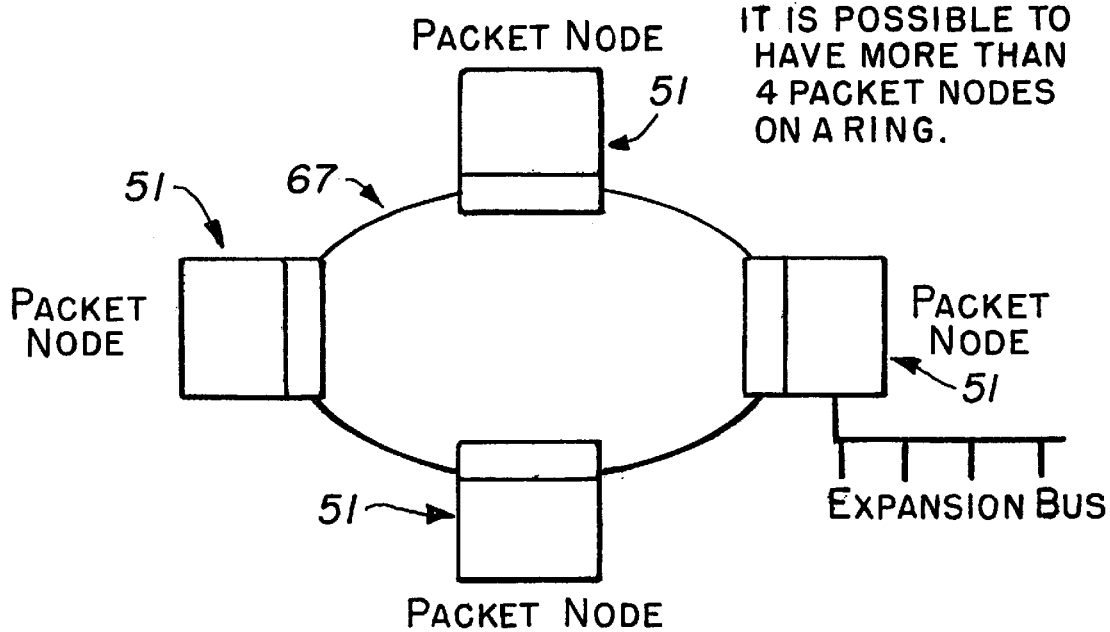
FIG. 24 shows a possible ring interconnect topology for packet nodes.
Figure 25:
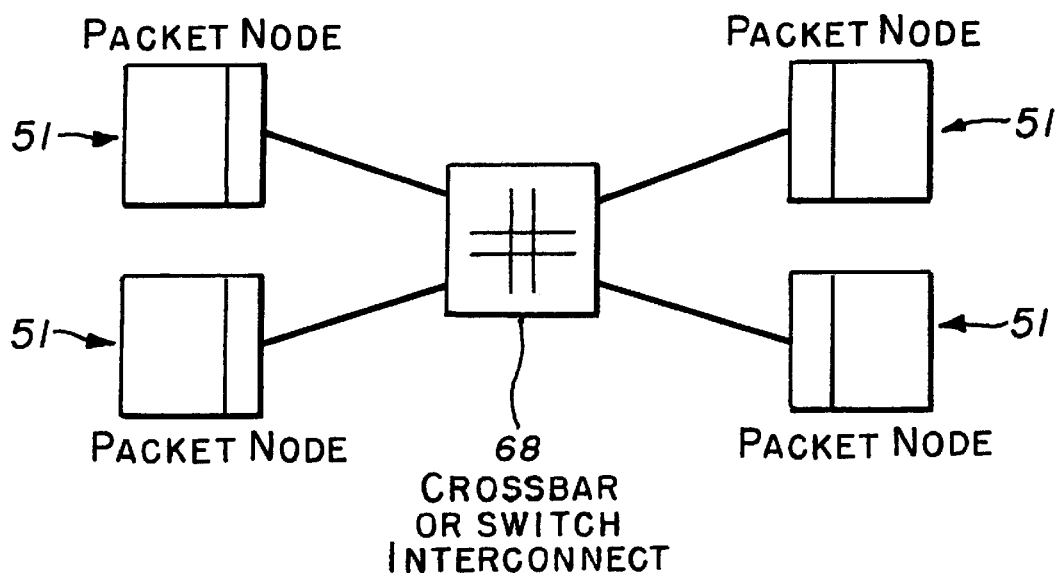
FIG. 25 shows a possible switched interconnect topology for packet nodes.
Figure 27:
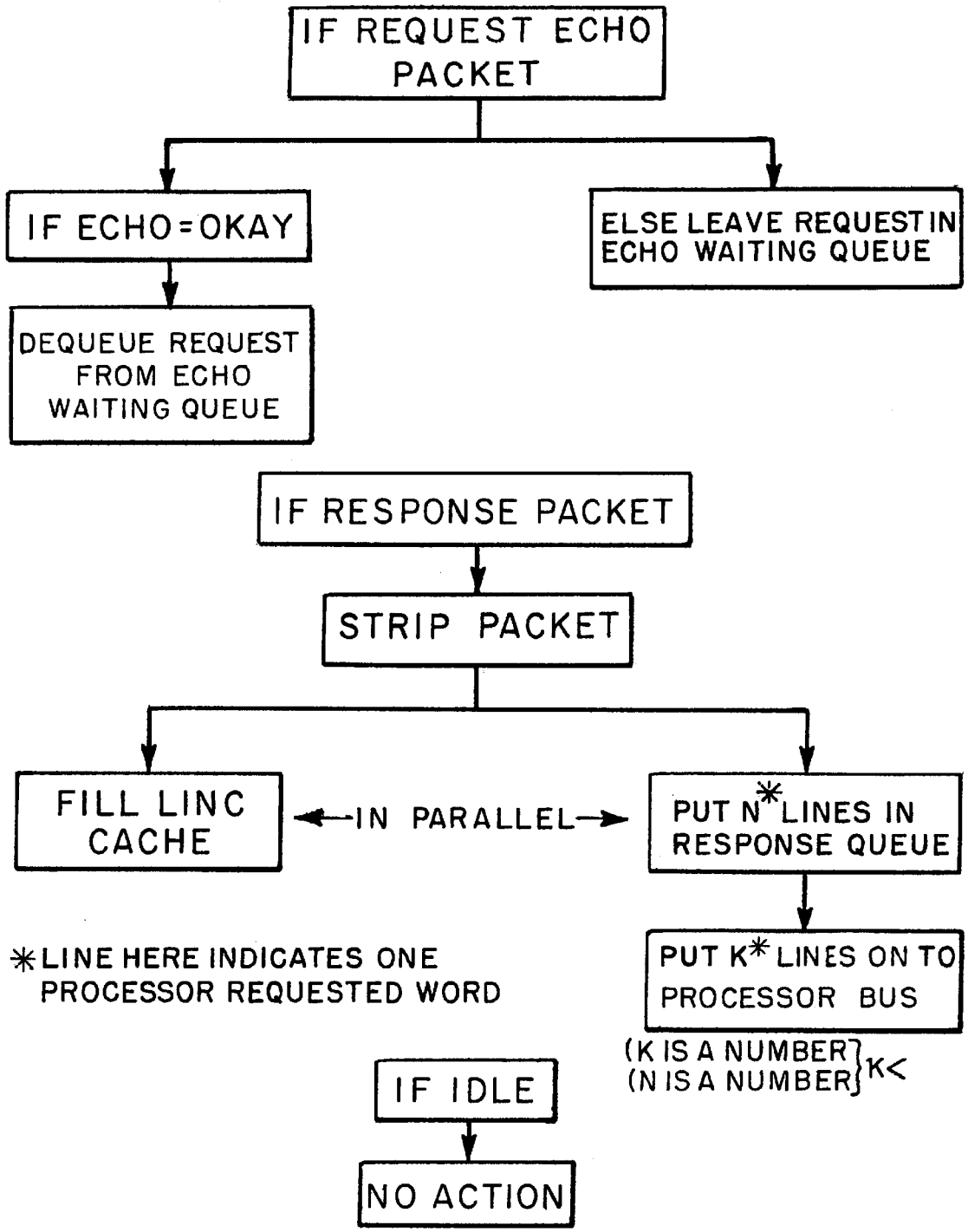
FIG. 27 is a flow graph of the processor node receive protocol.
Figure 28:
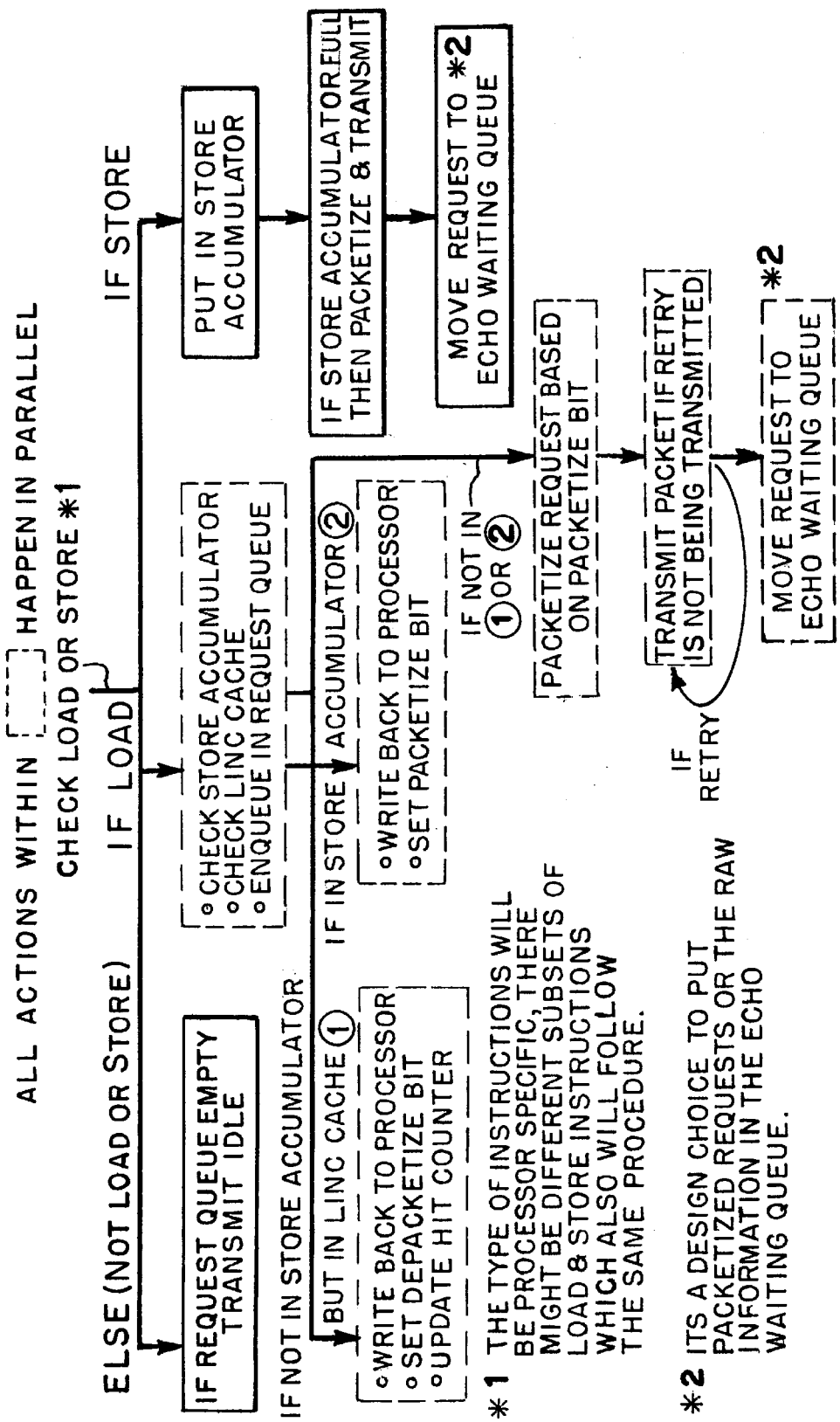
FIG. 28 is a flow graph of the processor node transmit protocol.
Figure 29:
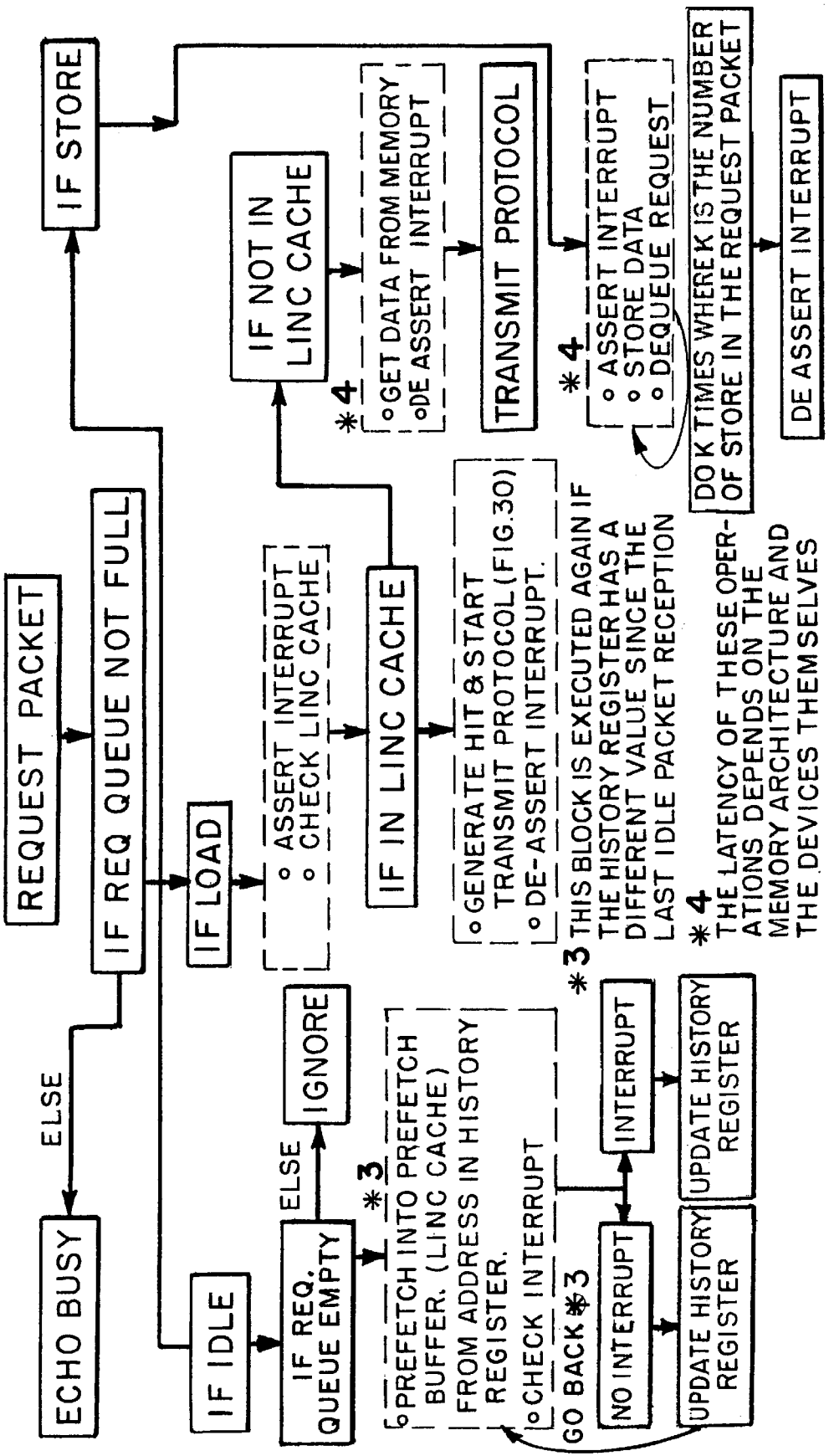
FIG. 29 is a flow graph of memory node receive protocol.

To extend the capability of the present invention to an arbitrary number of nodes requires an expanded interconnect. FIG. 24 and FIG. 25 depict two possible interconnection schemes.

FIG. 24 shows a topology commonly referred to as a ring interconnect 67. In this type of interconnect, each link interface's physical link output is connected to a neighboring nodes link interface physical input until the ring is closed. For this type of implementation, the link interface must implement a pass-through mechanism. That is, each link interface must compare its node ID to the node ID of the packet header. If the compare is not successful, the link interface must forward the packet just received on its physical link input to its physical link output. In this way, packets circulate in the ring until they arrive at their ultimate destination. This receive-check-forward mechanism is functionally similar to that described in the IEEE 1596 (SCI) specification (Elastic Buffer).

To improve performance over a ring, FIG. 25 shows another common interconnect topology commonly referred to as a switch 68. The switch 68 of FIG. 25 may be a crossbar switch, a shuffle switch, a broadcast crossbar switch, or similar device. Implementations of crossbar switches are well known to the art and it is sufficient to describe a cross bar as N, M to 1 multiplexers, where N is the number of output ports and M is the number of input ports. When a crossbar switch is used, each link interface must check the node ID of the received packet to guarantee that the packet is intended for the receiving node. This straightforward modification to the link interface physical link input circuitry is to include an ID decoder in the receive logic before queuing the request.

FIG. 9 depicts a functional diagram of the link interface 49. The Host Interface 60 provides the means to connect the link interface to the bus of the functional unit 48 (i.e., processor, memory, I/O, disk, etc.) This part of the link interface contains all the necessary hardware to handshake with the functional unit node and is specific to the said functional unit. It also provides for all necessary signals to complete bus cycles needed for the functional unit.

The Store Accumulator 61 is responsible for packing data into a packet body for the STORE instruction. This is especially useful when the processor node is doing a burst write. In this case, the several data and addresses that are sequentially output by the processor are accumulated by the Store Accumulator 61 of the link interface and packed into one store message packet. Thus, a single message transaction results in several data being stored by the receiving node.

The Control block 62 provides for control of the internal components of FIG. 9 as well as coordinating the functioning of the physical link. Control block 62 is essentially a state machine that keeps track of the link state and provides the necessary housekeeping functions of the link. Control block 62 also contains the history register which is used by the requester in conjunction with the Linc Cache 63 'hit' information to determine the desired size-of-response for a given request. This same register is used by the receiver to determine how much data and from where said data may be returned when the receiver detects an IDLE packet. The detailed operations that Control block 62 performs are disclosed in association with the operation of each the blocks of FIG. 9 and the link interface.

Request Queue 64 provides buffering and storage for all accesses coming from a functional unit 48. These accesses can either be stored in raw form (node address and data format), or in packetized form, depending upon the access arrival rate. That is, based on the rate that accesses come into the link interface from the functional unit 48, the access may be stored raw and then packetized as the access is converted to a request packet and placed on the physical link or the access may be packetized prior to being placed in the queue. With reference to FIG. 10, if the access is being stored as a packet in the Request Queue 64, the queue is configured, as in FIG. 10a, to be two bytes wide plus one bit for frame. The frame bit 67 is used to indicate the presence of header on the current cycle. If the access is being stored raw, then the request queue is reconfigured to be as wide as the functional unit's address width 68 plus data width 69 plus the instruction field width 70 as in FIG. 10b.

The Echo Waiting Queue 65 of FIG. 9, is operable to function as storage for outstanding Request packets. These Request packets are copied into the Echo Waiting Queue 65 until an ECHO OKAY packet is received from the node catering to the request. Storing outstanding requests provides the means for the Control Block to handle out-of-order RESPONSE packets and to verify link integrity by making sure that all requests are being responded to.

Figure 11A:
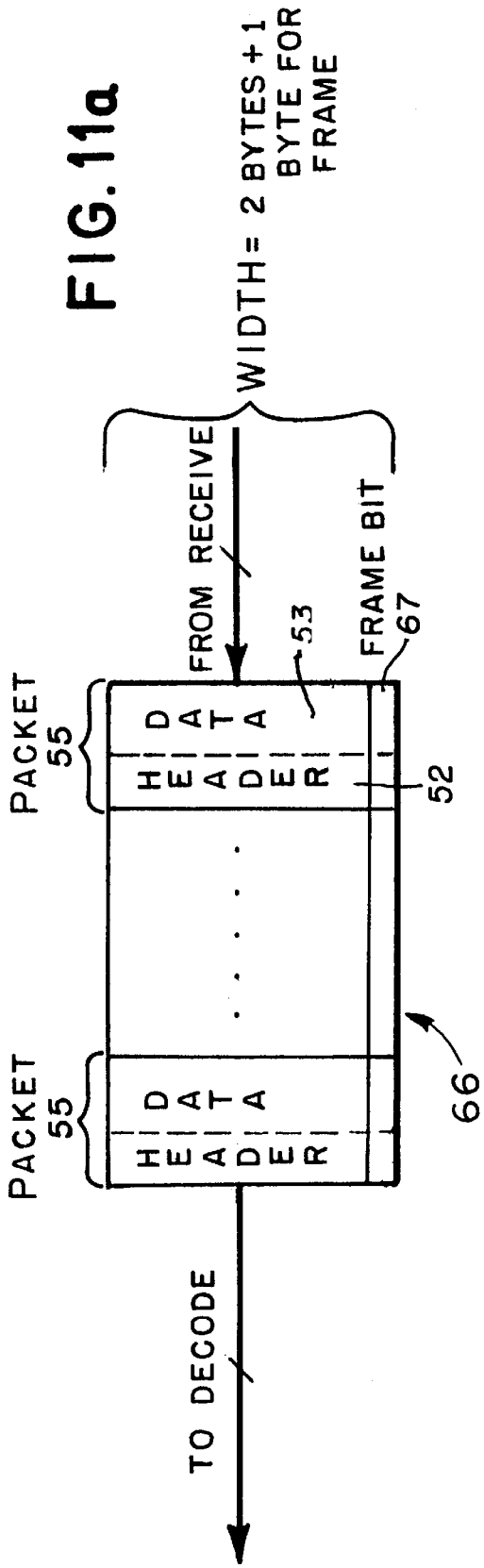
FIGS. 11a and 11b show the possible structures of a response queue shown in FIG. 9.
Figure 11B:
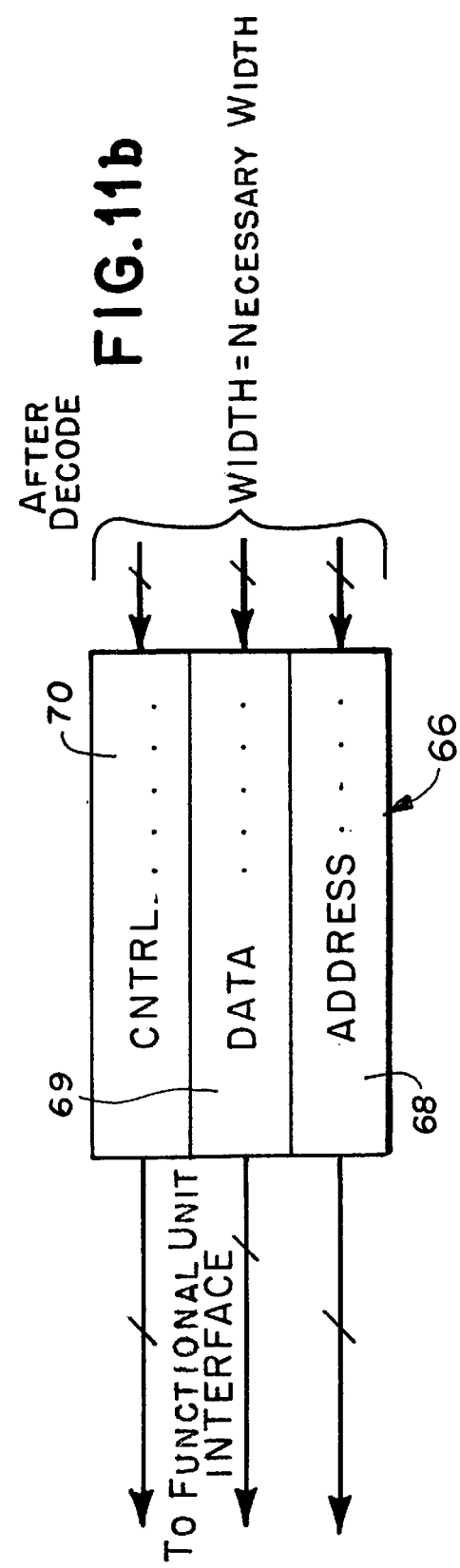

The Response Queue 66 has a structure similar to the Request Queue 64. It may be configured as in FIG. 11 and its operation is the reverse of the Request Queue. The Response Queue can store either packetized information as received from the physical link for later depacketization and passage to the functional unit (function unit data-need is slow), FIG. 11a, or information received from the physical link may be immediately depacketized and stored raw for delivery to the functional unit (functional unit data-need is fast), as in FIG. 11b.

Linc Cache 63 is basically a directed mapped cache for caching response data for the functional unit. The size of the Linc Cache 63 is an integer multiple of the maximum data packet size 53, i.e., m×256. To keep track of the latest data, the Linc Cache 63 is partitioned into two identical blocks;

one block containing the latest information 71 and the other block containing the information received before and up to the latest update 72.

Figure 12:
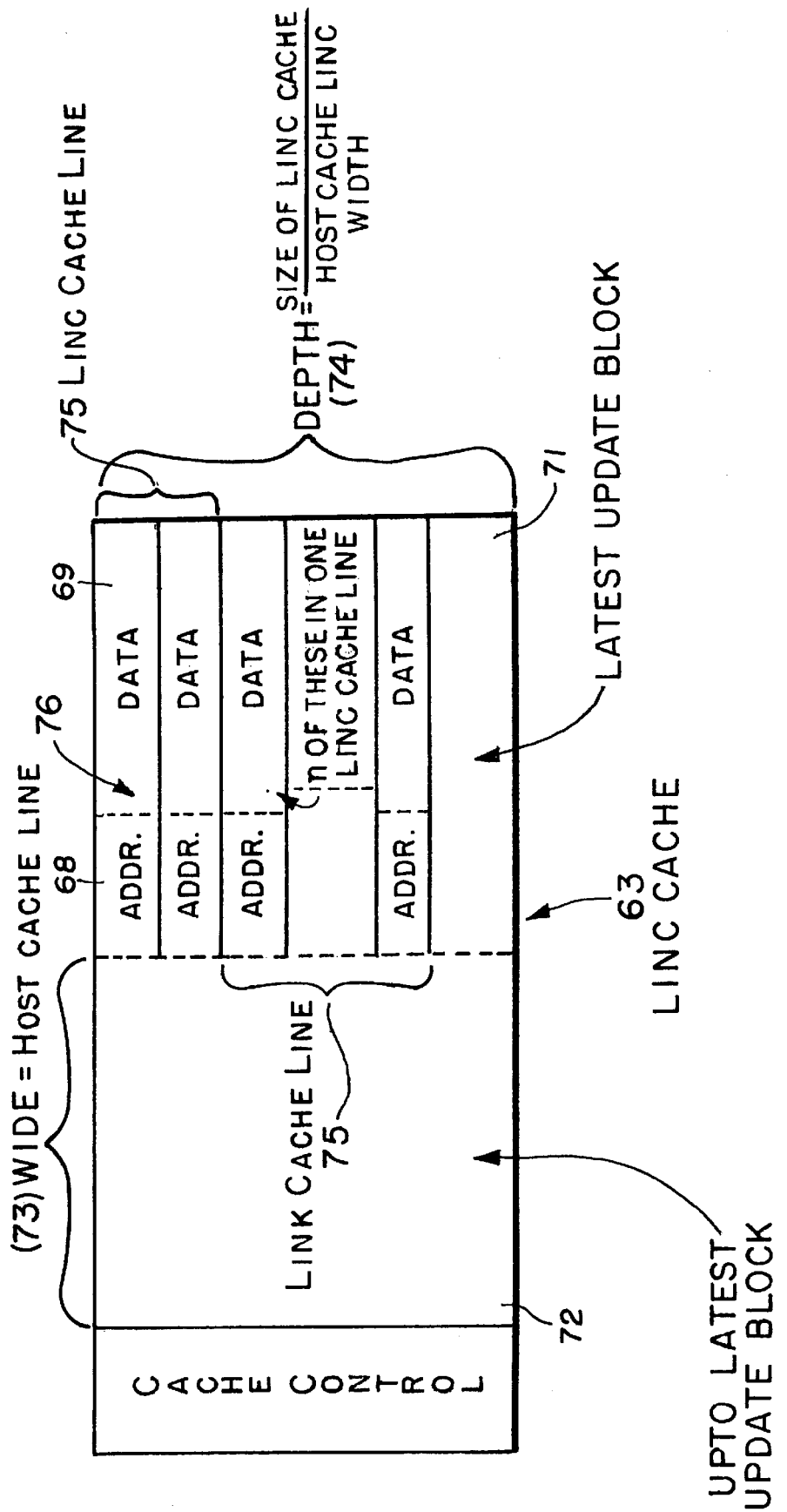
FIG. 12 shows the structure of a linc cache shown in FIG. 9.

With reference to FIG. 12, each block of the Linc Cache 63 is of fixed size (width 73 and depth 74). However, the Linc Cache line 75 size is variable. Furthermore, the Linc Cache line size is always at least as long as the functional unit's cache line 76 size. There are N words in a Linc Cache line, where N is dynamically variable. If an access from the functional unit misses in the Linc Cache, the link interface will request the data from the proper node. The amount of data requested by the link interface, N, depends on the history of the 'hit' rate within the Linc Cache. If the hit rate is high, the control circuitry increase the Linc Cache line size thus maximizing data transmission per physical link transaction. If the hit rate is low in the Linc Cache, the Linc Cache line size is reduced in order to reduce the size of messages on the physical link.

The motivation for this unique and counterintuitive approach to cache management is the realization that if the hit rate to the Linc Cache is low, the accesses are almost certainly not sequential and are unpredictable. Thus, increasing the Link Cache line size will probably not improve the hit rate. Therefore, the invention reduces the line size (which will probably not hurt the hit rate but will make the link available for all nodes more often since message sizes from this node will now be smaller).

Figure 14:
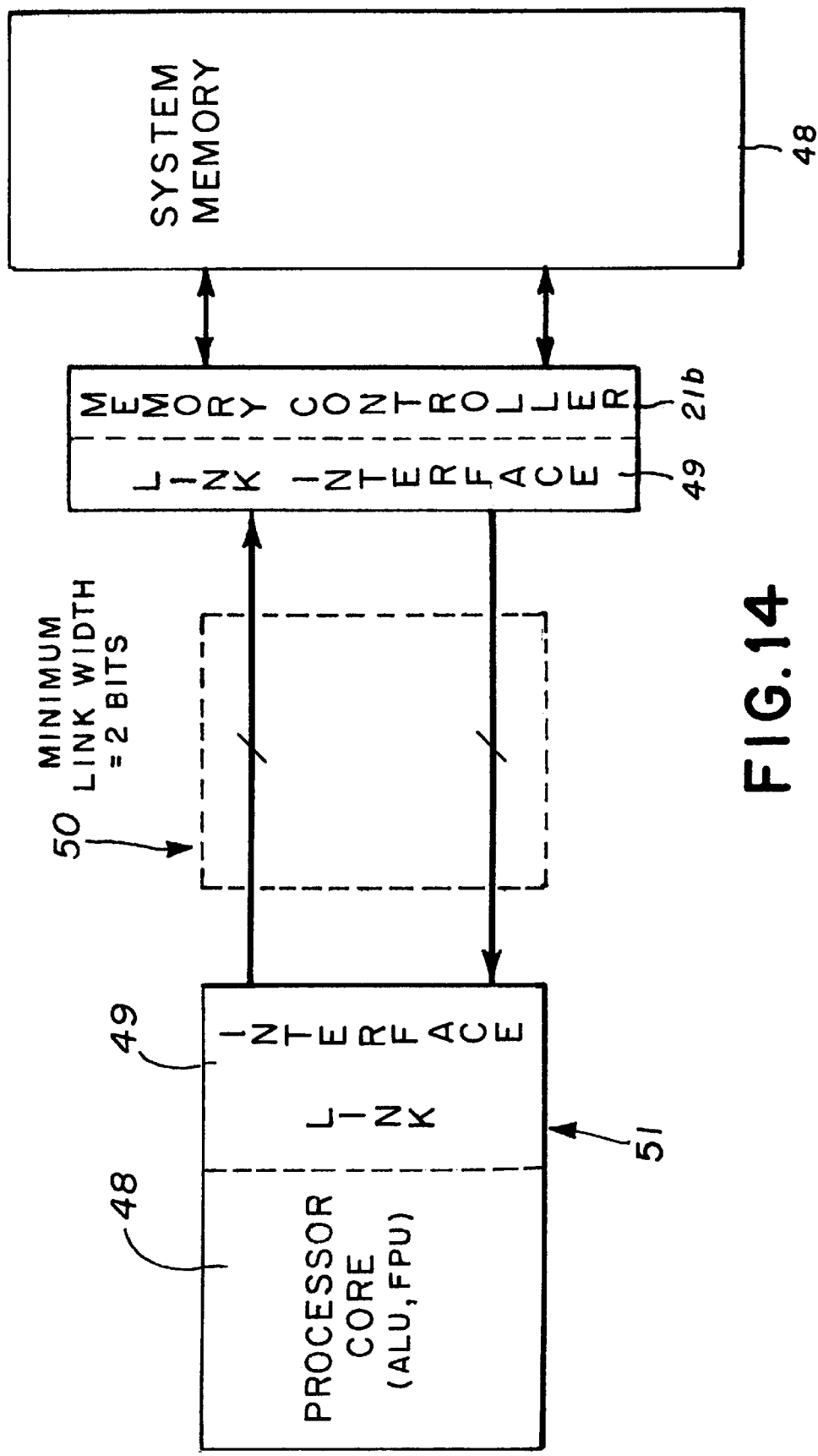
FIG. 14 shows a processor with an embedded link interface connected to system memory through another link interface.
Figure 15:
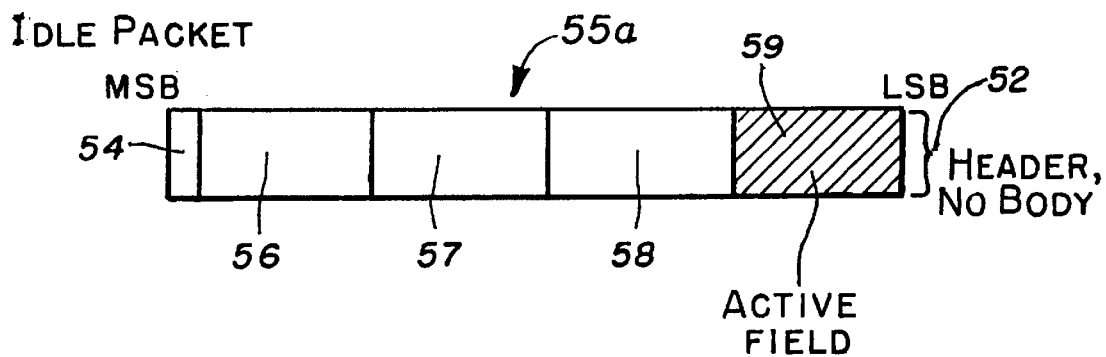
FIG. 15 shows detailed structure of the Idle packet for processor memory I/O.
Figure 16:
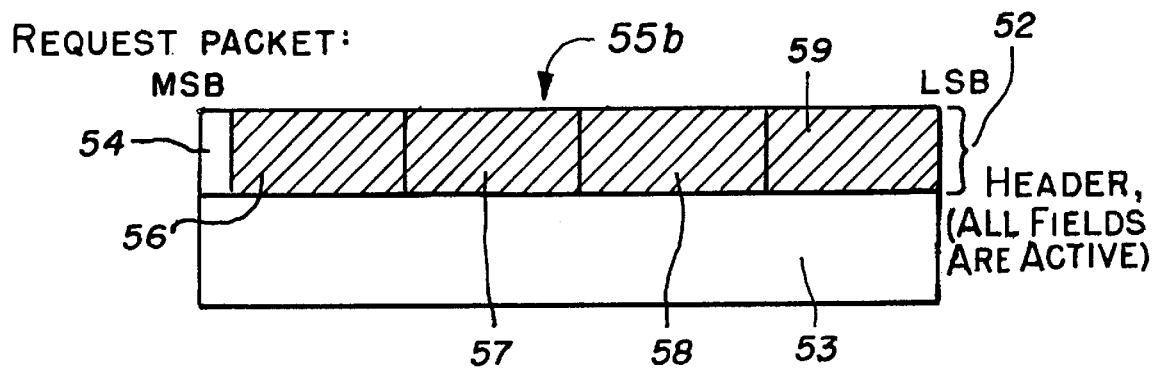
FIG. 16 shows detailed structure of the request packet for processor memory I/O.
Figure 17:
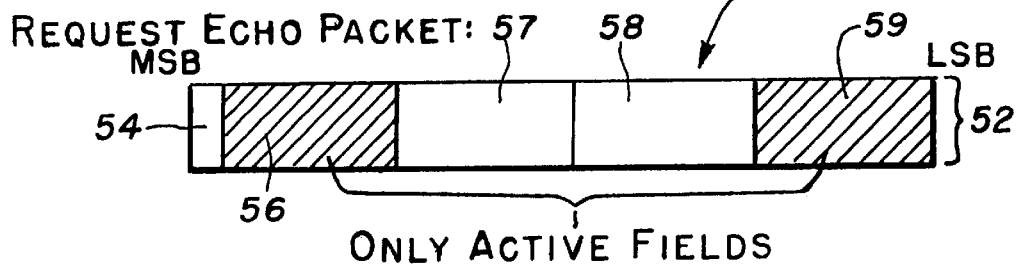
FIG. 17 shows a detailed structure of a Request Echo packet for processor memory I/O.

FIGS. 13 and 14 depict two possible embodiments of the link interface 49. FIG. 13 shows an implementation wherein the link interface is separate from any of the node's circuitry. FIG. 13a shows an implementation where the physical link is on a motherboard or external physical channel with link chips for each node. The link chips in FIG. 13a only contain the link interface 49. FIG. 13b shows an implementation where the physical link is embedded inside a single chip or a linc chip 39. The linc chip 39 contains both a link interface 49 and the physical link or channel 50. FIG. 14 shows an implementation wherein the link interface associated with the processor node is include within the processor silicon itself. FIG. 13b will be discussed first.

Figure 20:
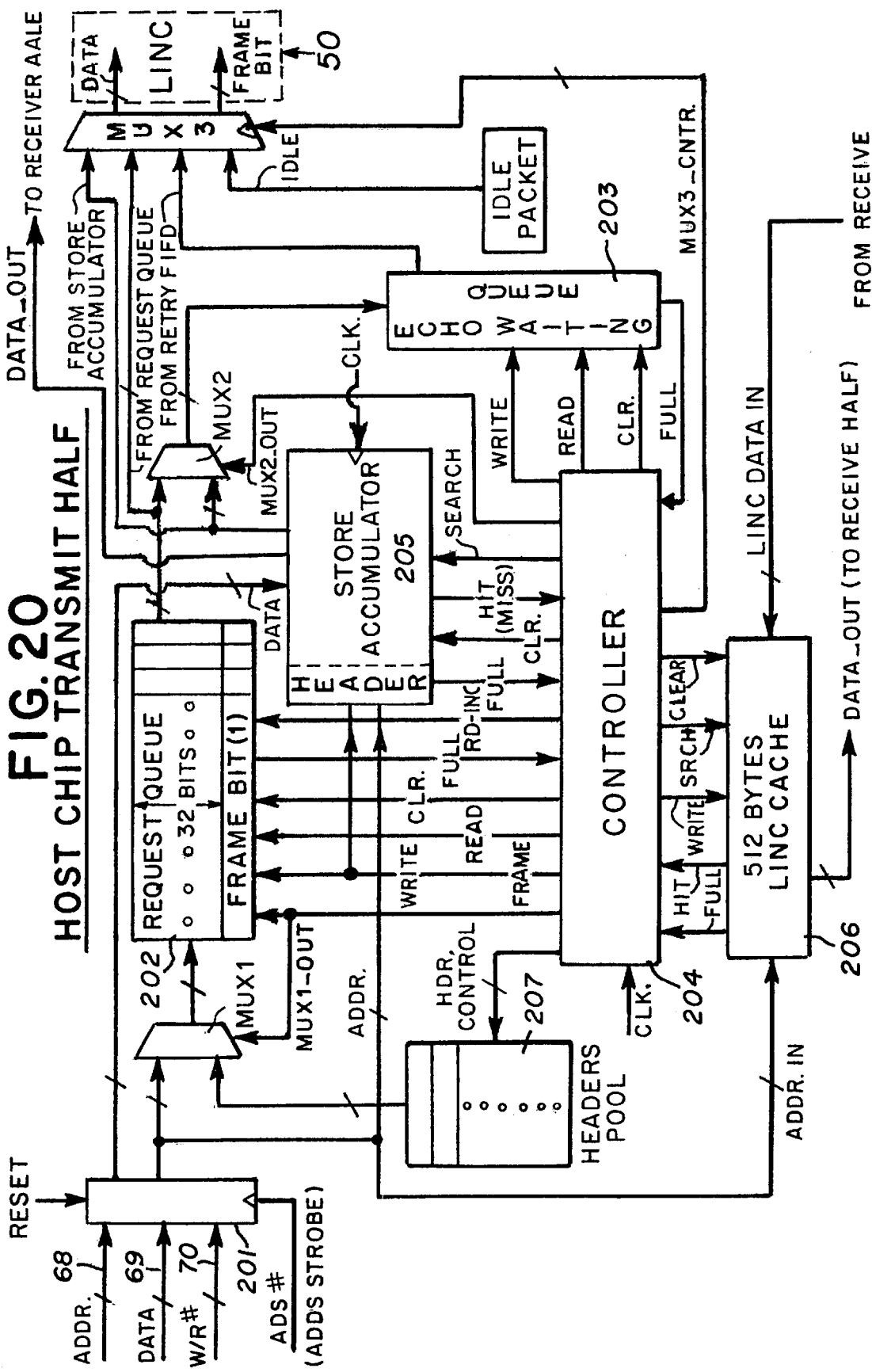
FIG. 20 is a detailed schematic of the processor node interface chip transmit half.
Figure 21:
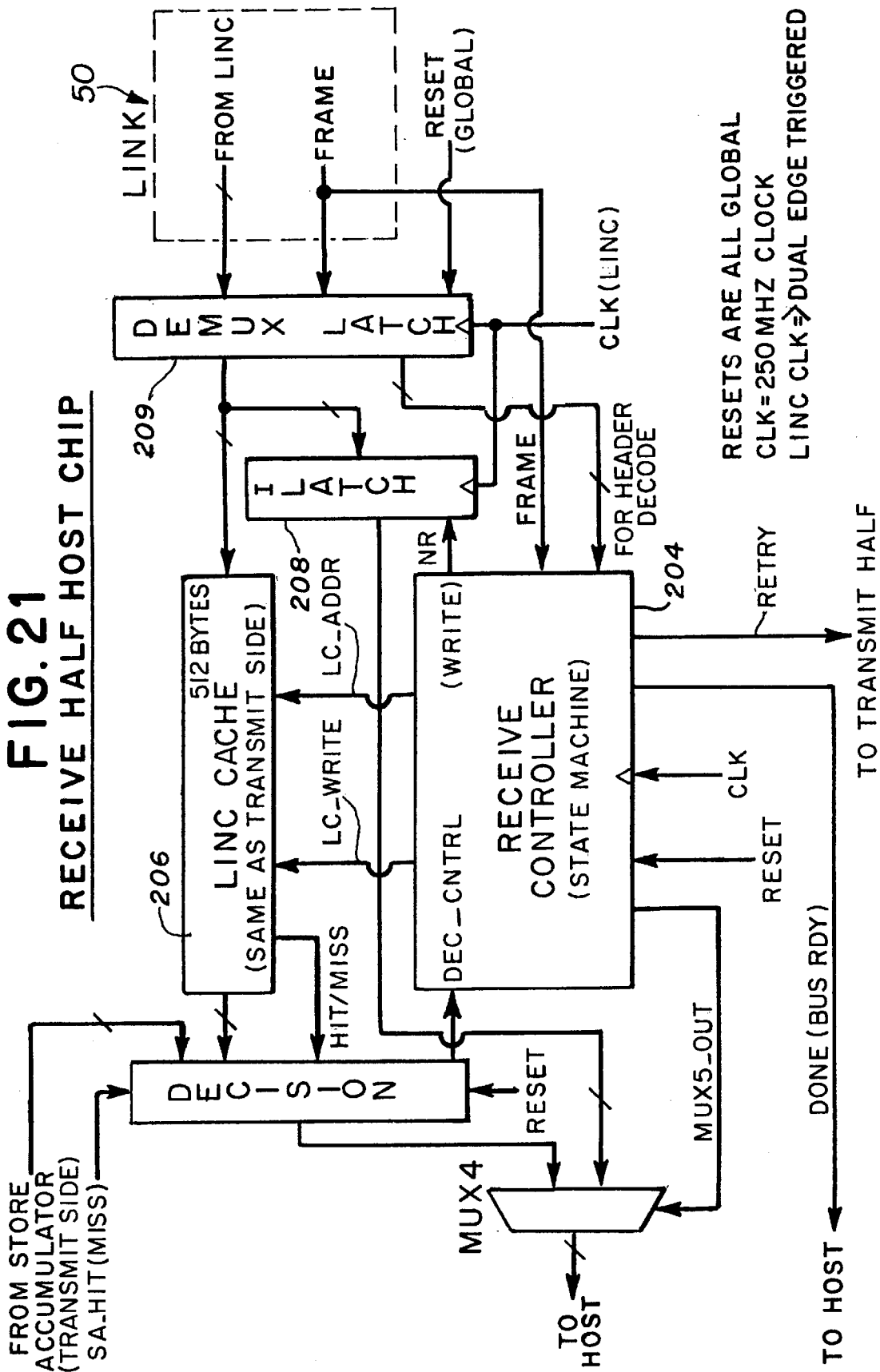
FIG. 21 is a detailed schematic of the processor node interface chip receive half.

FIGS. 20 through 23 show a detailed implementation of a link interface. With no loss of generality, the interconnect is assumed to be a two point, point to point interconnection between a processor node and a memory node. It will be shown in the description to follow how the memory node interface may be extended to include any peripheral device FIGS. 20 and 21 depict the transmit and receive, respectively, link interface circuitry for the processor node. With respect to FIG. 20, the transmit operation starts when the processor node (host) begins a bus cycle. The transmit circuitry latches the necessary data and address information into latch 201. As the data and address are being latched, the bus cycle of the processor node is decoded to be either a read or write (load or store). In either case, control circuitry 204 enables the appropriate header from header pool 207. This header pool encodes all possible header types since the type of processor is known to the specific implementation of the link interface and allows for faster assembly of a packet. The header is put in the request queue 202 and then the address/data/control of the bus cycle is mapped to the packet as it is put in the request queue 202. The request queue 202 operates in a first in, first out (FIFO) manner. If the cycle is deciphered to be a store then the request is stored in the store accumulator 205. After the store accumulator 205 is full the control attaches a header to the information in the store accumulator 208 and sends it out on the physical linc 50. Once any request has been sent out, it is queued in the echo waiting queue 203 to await the receipt of an ECHO OKAY. During the queuing of a request, when a load or read request is received from the processor node, there is a search done in the linc cache 206 and the store accumulator 205 to determine whether the request can be catered to without going out on the linc (i.e., check to see if a linc cache hit occurs).

Referring to FIG. 21, in the receive operation, once a packet is received over the physical link, the intelligent latch 208 and demultiplexer 209 combination allows depacketization of the incoming information and the storing of the data/address in the linc cache 206. Because of the variable linc cache line size, the returning requested data will be more than the original processor required amount (to fill the larger linc cache line). Finally, the control 204 issues the appropriate bus and control signals to satisfy the processor node request.

Figure 22:
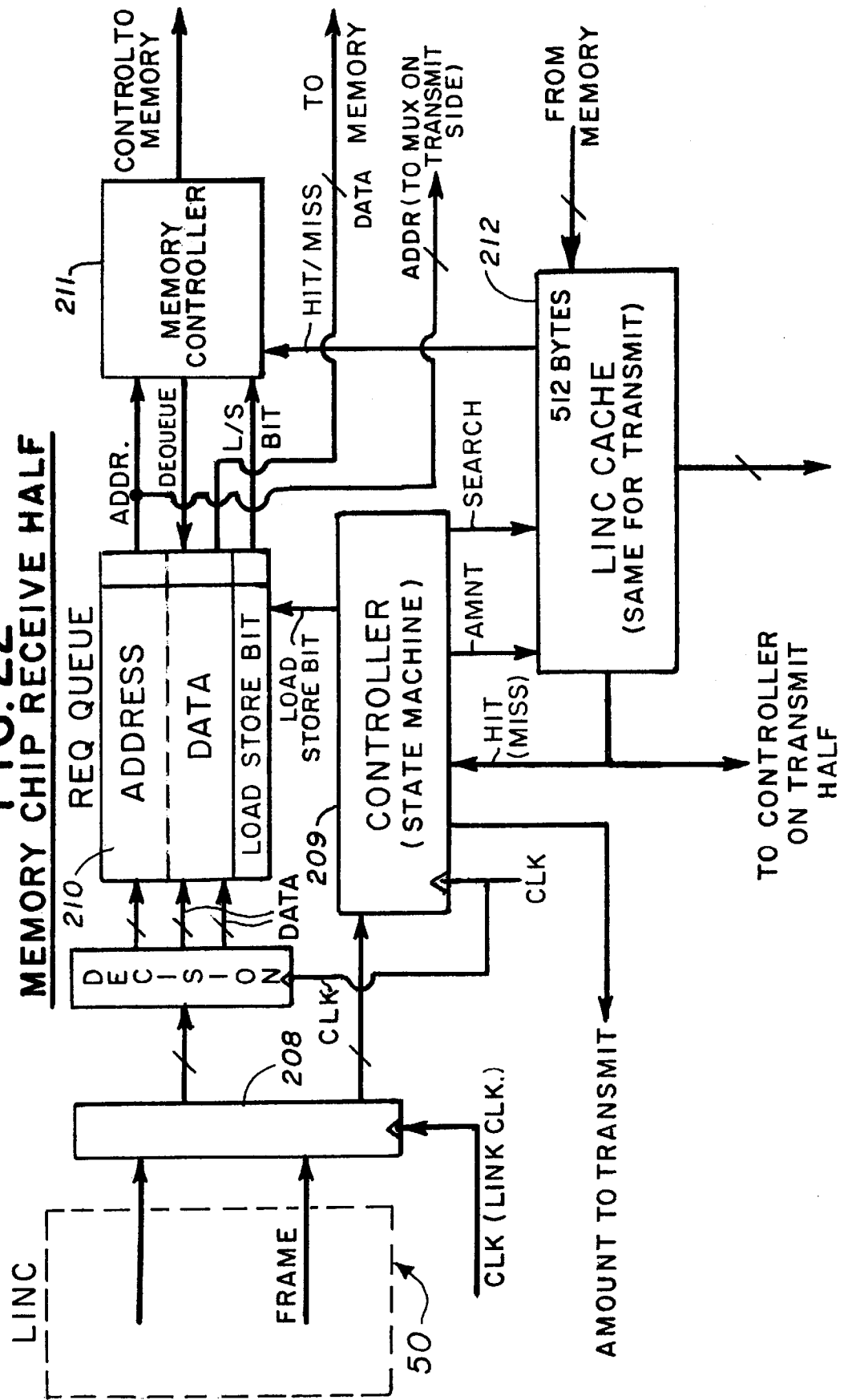
FIG. 22 is a detailed schematic of the memory node interface chip receive half.

The receive operation for the memory node with respect to FIG. 22 is described below. The data comes in on physical link 50 and latch 208 takes the data and appropriately fills the request queue 210. The request queue 210 contains the raw request which then goes to the memory controller 211 for the appropriate action. The design and implementation of the memory controller is specific to memory devices being used and the system memory architecture. Once a load request has been received, the controller 209 checks the linc cache 212 to see if the data is ready to be packetized and sent across the physical link 50. This saves cycles since it is not necessary to assert the appropriate control signals to start the memory access cycle if there is a hit in the linc cache 212. If the request received is a store request, then it is directly sent to the memory controller 211 for appropriate action.

Figure 23:
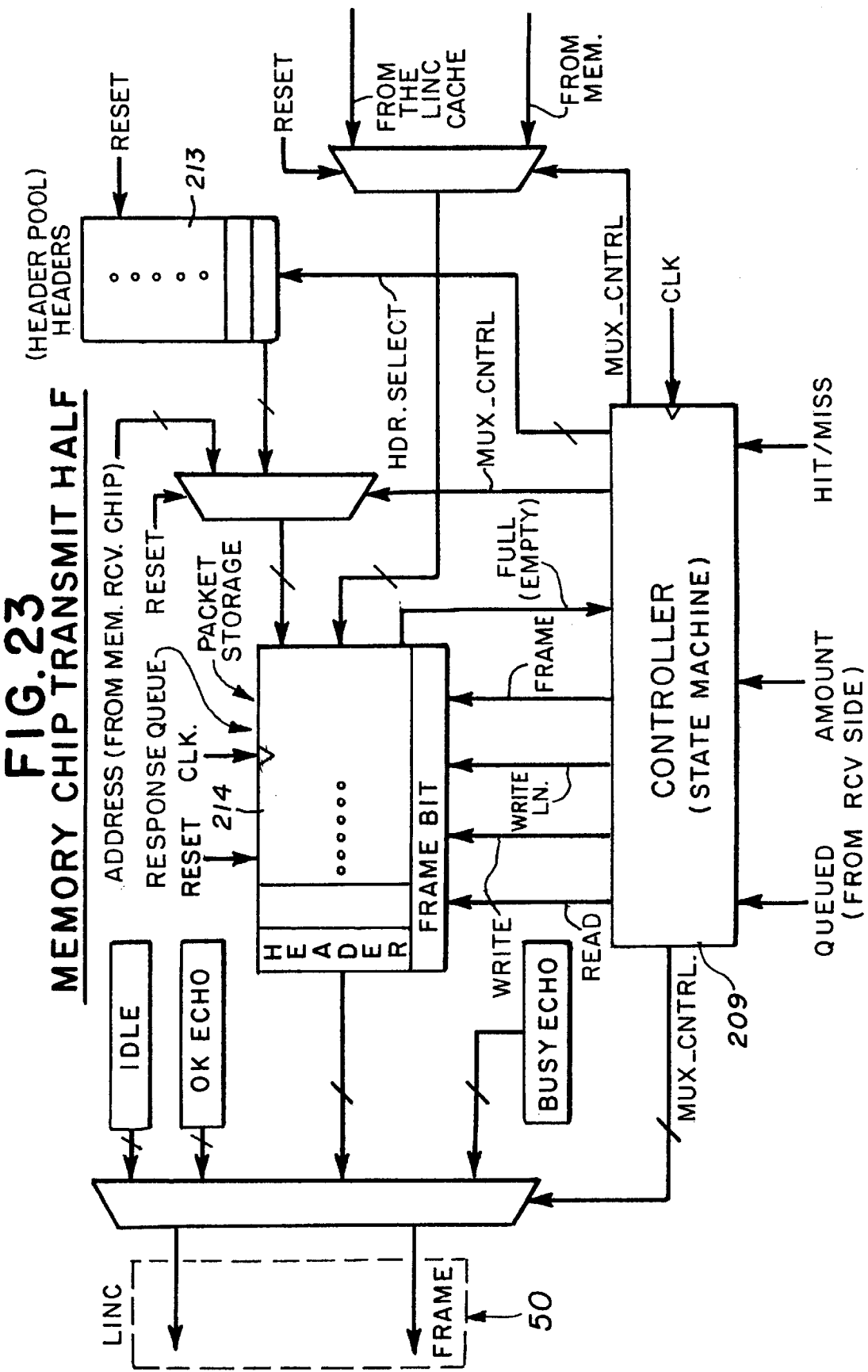
FIG. 23 is a detailed schematic of the memory node interface chip transmit half.

The transmit operation with respect to FIG. 23 is briefly described below. Once a request is received, header pool 213 is indexed to provide the appropriate header for the response packet. The request that was received over physical link 50 and stored in the request queue 210 is dequeued and the response is then taken out of the linc cache 212 or the memory and packetized by attaching the appropriate headers and put into the response queue 214. The response queue has a FIFO operation similar to any of the other queues used in the current implementation and so the response will be sent when it is at the head of the queue.

It is important to realize that FIGS. 22 and 23 describe an Functional Unit specific implementation embodying a memory node. With the addition of a store accumulator and the appropriate controller that replaces the memory controller 211 in FIG. 22, this circuitry can be adapted to Functional Units of any type on any node.

Figure 30:
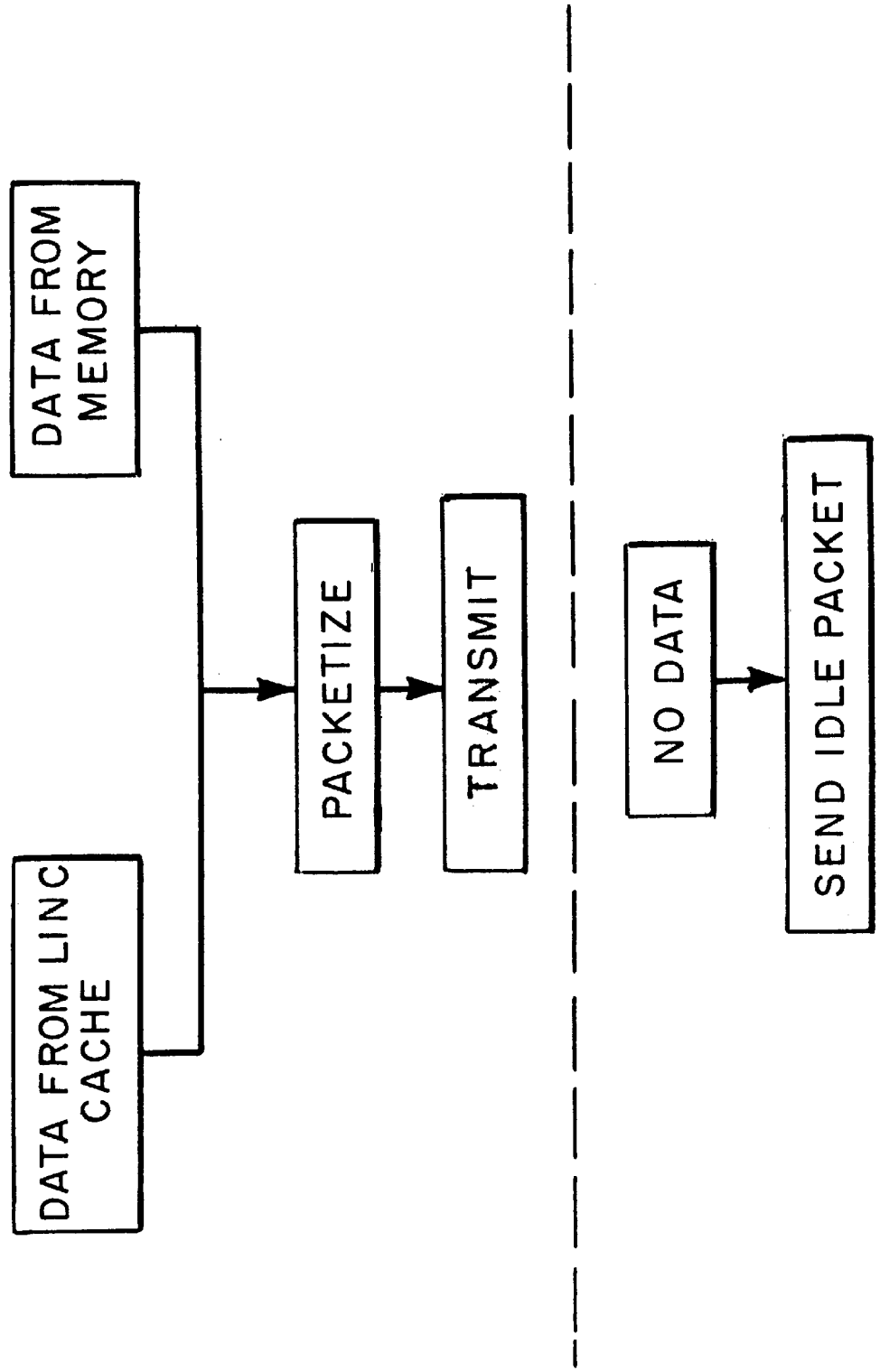
FIG. 30 is a flow graph of memory node transmit protocol.

The protocols used for communication between the processor node and the memory node are described in the flow graphs in FIGS. 27, 28, 29 and 30. These protocols are:
 1) Processor node Protocols
   a) Receive Protocol (FIG. 27)
   b) Transmit Protocol (FIG. 28) and
 2) Memory node Protocols
   a) Receive Protocol (FIG. 29)
   b) Transmit Protocol (FIG. 30)

The flow graphs in conjunction with the description described herein describe the functioning of the link between the processor node and the memory node.

FIG. 14 depicts a provision of the link interface on the same silicon as the processor. This results in several important simplifications and improvements. Moving inside the processor silicon allows the link interface access to the Translation Lookaside Buffer (TLB) and the Branch Target Buffer (BTB) which allows the implementation of sophisticated prefetching and caching schemes.

Microprocessors typically do speculative execution based on the load/store instructions in a program. For standard arithmetic logic unit (ALU) operations, it is relatively easy to identify the register operands needed to be accessed during the instruction decode phase itself. However, for memory access operations, significant improvement is possible. In particular, the determination of the memory location that needs to be accessed requires an address calculation. The load/store instructions are issued to a pre-execute engine where address calculation is performed. After address calculation, the virtual address is translated into a physical address, if necessary. This address is then issued to the memory interface of the processor to form the appropriate request.

By moving the link interface inside the processor, access is gained to TLB which stores a lookup table or cache translation descriptors of recently accessed pages. This information is very valuable in doing intelligent memory prefetches because now the link interface can look at the TLB and decide the location and access size of prefetches.

When the link interface is within the processor, the interface also gains access to the BTB. This allows two important benefits. First, in any given program or code, there typically is a branch or jump every five instructions, on the average. The branch prediction mechanism of the processor allows the processor to do speculative execution by predicting where it needs to go four or five instructions ahead of the current program counter (PC). When the branch predictor is wrong, there is a huge performance penalty in the processor because of stalls and pipelines running empty. By having access to the BTB, the link interface knows all possible outcomes of the branch and can prefetch data/instructions for all of the possible outcomes and have this information available at the processor. In this way, performance penalties due to branch prediction errors are significantly reduced. This implements a virtual zero wait-state operation to memory on a branch miss.

Second, in the rare event that there are no jumps in the program, FIG. 26 shows a method of obtaining performance improvement. Rather than fetch a large block of data from a single address, each packet would be configured to fetch several smaller blocks of data from several different addresses. In this context, "data" means both program data and processor instructions.

For all of the above detailed embodiments of the invention, FIGS. 15, 16, 17, 18 and 19 show the specific implementations of the packet structures along with which fields of the header are active for each packet type.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A physically non-distributed microprocessor-based computer system, comprising:

a microprocessor;

a random access memory device;

a mass storage device;

an input-output port device;

said devices each being operable in conjunction with said microprocessor and including an interface for receiving and transmitting data in packet form; and a packet-based data channel extending between said microprocessor and said interfaces of said devices for providing simultaneous bi-directional communication between said microprocessor and said devices.

2. A computer system as defined in claim 1 wherein said data channel comprises a first signal path in one direction and a second signal path in the other direction.

3. A computer system as defined in claim 1 wherein said data channel includes switching means for selectively connecting said microprocessor to selected ones of said devices.

4. A computer as defined in claim 3 wherein said switching means comprise a microprocessor controlled switch providing individual interconnection between said microprocessor and any one of said devices or between any two or more of said devices.

5. A computer as defined in claim 3 wherein said switching means comprises a ring circuit connecting each of said interface circuits.

6. A computer as defined in claim 1 wherein said packets include a request-type packet and a reply-type packet, said reply packet being sent by said devices in reply to receipt of said request packet by said device.

7. A computer as defined in claim 6 wherein said request packet includes indicia indicating the size of the reply packet to be returned.

8. A computer as defined in claim 7 wherein each of said data packets includes a header, and said header includes data indicative of the size of the expected reply packet.

9. A computer as defined in claim 7 wherein the size of the reply packet to be sent is dependent on the plurality of prior such transactions, where such said transactions result from similar requests for packets of data.

10. A computer system as defined in claim 1 wherein said interface circuits each include a means whereby the data transmitted from the associated device in a packet remains in storage pending receipt of a reply packet.

11. A computer system as defined in claim 1 wherein said packets include inquiry-type packets reply-type packets, and idle-type packets.

12. A computer system as defined in claim 11 wherein said idle-type packets are periodically sent when one of said devices is not requesting an action from any other said devices or responding to an action from any other said devices.

13. A computer system as defined in claim 1 wherein said interface circuits each include:

a linc cache;

said linc cache being organized with a variable line size direct mapped cache; and said cache line is larger than the cache line in the host cache.

* * * * *

UNITED STATES PATENT AND TRADEMARK OFFICE
CERTIFICATE OF CORRECTION

PATENT NO. : 6,009,488 C2
APPLICATION NO. : 90/009376
DATED : November 13, 2012
INVENTOR(S) : Gautam Kavipurapu It is certified that error appears in the above-identified patent and that said Letters Patent is hereby corrected as shown below:

In claim 29, column 1, line 30: delete ";"
In claim 29, column 1, line 40: should read "one of said interfaces to a second interface."
In claim 29, column 1, line 43: should read "packet by said second interface; and"
In claim 29, column 1, line 44: delete "one of said"
In claim 29, column 1, line 45: delete "s" from word "interfaces" to read "interface"
In claim 29, column 1, line 48-49: should read "mitted to said second interface by said first interface."
In claim 32, column 2, line 28: "line" should be "linc"
In claim 32, column 2, line 31: "line" should be "linc"
In claim 33, column 2, line 55: delete "and"
In claim 33, column 2, line 58: delete "." and insert --; and a first one of said interfaces including a first buffer for queuing packets for a transmission, and a second buffer for storing a copy of a packet transmitted by said first interface to a second one of said interfaces, said second buffer storing said copy pending receipt of a reply packet acknowledging receipt of said transmitted packet by said second interface.--
In claim 34, column 3, line 17: delete "and"
In claim 34, column 3, line 20: delete "." and insert --; and a first one of said interfaces including a first buffer for queuing packets for a transmission, and a second buffer for storing a copy of a packet transmitted by said first interface to a second one of said interfaces, said second buffer storing said copy pending receipt of a reply packet acknowledging receipt of said transmitted packet by said second interface.--
In claim 35, column 4, line 12: delete "and"
In claim 35, column 4, line 14: delete "." and insert --; and a first one of said interfaces including a first buffer for queuing packets for a transmission, and a second buffer for storing a copy of a packet transmitted by said first interface to a second one of said interfaces, said second buffer storing said copy pending receipt of a reply packet acknowledging receipt of said transmitted packet by said second interface.--
In claim 36, column 4, line 15: delete "and" and replace with "or"
In claim 37, column 4, line 20: delete "and" and replace with "or"

Signed and Sealed this
Twelfth Day of February, 2013

Teresa Stanek Rea
*Acting Director of the United States Patent and Trademark Office*

In claim 38, column 4, line 23: delete "and" and replace with "or"
In claim 39, column 4, line 26: delete "and" and replace with "or"

(12) EX PARTE REEXAMINATION CERTIFICATE (6652nd)
United States Patent
Kavipurapu

(10) Number: US 6,009,488 C1
(45) Certificate Issued: Feb. 10, 2009

(54) COMPUTER HAVING PACKET-BASED INTERCONNECT CHANNEL

(75) Inventor: Gautam Kavipurapu, Dallas, TX (US)

(73) Assignee: Microlinc, LLC, Chicago, IL (US)

Reexamination Request:
No. 90/008,106, Jun. 30, 2006
No. 90/008,196, Aug. 28, 2006
No. 90/009,098, Mar. 26, 2008

Reexamination Certificate for:
Patent No.: 6,009,488
Issued: Dec. 28, 1999
Appl. No.: 08/965,760
Filed: Nov. 7, 1997

(51) Int. Cl.
*H04L 12/403* (2006.01)
*H04L 12/423* (2006.01)

(52) U.S. Cl. .............. 710/105; 710/3; 710/29; 710/30; 710/36; 710/240

(58) Field of Classification Search .............. None
See application file for complete search history.

(56) References Cited

U.S. PATENT DOCUMENTS

| | | |
|---|---|---|
| 5,530,701 A | 6/1996 | Stillman et al. |
| 5,687,388 A | 11/1997 | Wooten et al. |
| 5,721,874 A | 2/1998 | Carnevale et al. |
| 5,740,467 A | 4/1998 | Chmielecki, Jr. et al. |
| 5,742,840 A | 4/1998 | Hansen et al. |
| 5,752,272 A | 5/1998 | Tanabe |
| 5,777,987 A | 7/1998 | Adams et al. |
| 5,822,603 A | 10/1998 | Hansen et al. |
| 5,898,876 A | 4/1999 | James |
| 5,909,594 A | 6/1999 | Ross et al. |
| 5,915,104 A | 6/1999 | Miller |
| 5,946,322 A | 8/1999 | Moura et al. |
| 5,961,623 A | 10/1999 | James et al. |
| 5,991,824 A | 11/1999 | Strand et al. |
| 6,006,255 A | 12/1999 | Hoover et al. |
| 6,205,119 B1 | 3/2001 | Kaczynski |
| 6,266,338 B1 | 7/2001 | Simon et al. |
| 6,282,195 B1 | 8/2001 | Miller et al. |
| 6,683,876 B1 | 1/2004 | Tornes et al. |

OTHER PUBLICATIONS

Landon, "The SGI Origin: A ccNUMA Highly Scalable Server," 1997.
Scott, "The GigaRing Channel," Feb. 1996, IEEE.
Gustavson, "Scalable Coherent Interface," 1989, IEEE.
Galles, "Spider: A High–Speed Network Interconnect," Jan. 1997, IEEE.
Gillett, "Memory Channel Network for PCI," 1996, IEEE.
Davis, "P1996: High Reliability and Extensibility with PCI and SCI," http://www.scsi.com/Docs/P1996_PCI_SCI.pdf, 1996.
Deikman, "IEEE P1996 Meeting—High Reliablity PCI Bus," http://www.pcisig.com/reflector/msg00470.html, Sep. 1996.
Beck, "Dave Gustavson Answers Questions About SCI: Part III," http://www.hpcwire.com/archives/10316.html, Oct. 1996.
Gustavson, "IEEE Standard for Scalable Coherent Interface (SCI)," IEEE, 1993, New York, New York.
Davis, "HiRelPCI—An Extensible High Reliability Extended PCI Bus," IEEE, Mar. 26, 1998, New York, New York.

(Continued)

*Primary Examiner*—Woo H. Choi

(57) ABSTRACT

A physically non-distributed microprocessor-based computer includes a microprocessor, and a random access memory device, a mass storage device, and an input-output port device, all operable from the microprocessor and including an interface for receiving and transmitting data in packet form. A novel packet-based data channel extends between the microprocessor and the interfaces of the devices to provide communication between the microprocessor and the devices. By varying the size of the packets in accordance with actual data transmission requirements improved computer performance is achieved.

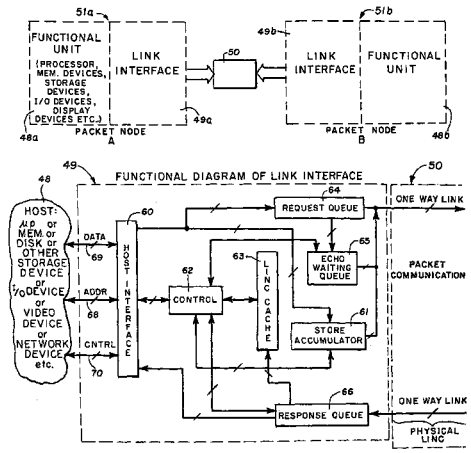

OTHER PUBLICATIONS

Whitfield, "Physical Layer Application Programming Interface for the Scalable Coherent Interface (SCI PHY–API)," IEEE, 1996, New York, New York.

Burger, "Simulation of the SCI Transport Layer on the Wisconsin Wind Tunnel," The Second International Workshop on SCI–based High Performance Low–Cost Computing, Mar. 1995.

No Specified Author or Editor, "Universal Serial Bus Specification, Revision 1.1," Compaq, Intel, Microsoft and NEC, Sep. 23, 1998, www.usb.org/developers/data/usb11cb.pd.

Teener, "P1394 Standard for a High Performance Serial Bus," Draft 8.0v4, IEEE, New York, New York, Nov. 21, 1995.

Gustavson, "The Scalable Coherent Interface (SCI)," IEEE Communications Magazine, Aug. 1996, pp. 52–63, vol. 34, Issue 8.

No Specified Author/Editor, IEEE Standard for High–Bandwidth Memory Interface Based on Scalable Coherent Interface (SCI) Signaling Technology (Ramlink), IEEE, 1996, New York.

Beck, "Dave Gustavson Answers Questions About SCI: Part 1," http://www.hpcwire.com/archives/10249.html, Oct. 1996.

Beck, "Dave Gustavson Answers Questions About SCI: Part 2," http://www.hpcwire.com/archives/10282.html, Oct. 1996.

Comer, "Internetworking with TCP/IP vol. 1: Principles, Protocols, and Architecture," pp. 192–211, 577, 3rd. Edition 1995.

Handy, "The Cache Memory Book," pp. 14–22, 47–49, 64–73, 1st Edition 1993.

Dubnicki, "Adjustable Block Size Coherent Cahces," Proceedings of the 19th Annual International Symposium on Computer Architecture, pp. 170–180, 1992.

Landon, "The SGI Origin: A ccNUMA Highly Scalable Server," 1997.

Scott, "The GigaRing Channel," Feb. 1996, IEEE.

Gustavson, "Scalable Coherent Interface," 1989, IEEE.

Galles, "Spider: A High–Speed Network Interconnect," Jan. 1997, IEEE.

Gillett, "Memory Channel Network for PCI," 1996, IEEE.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 13 is confirmed.

Claims 1–12 are cancelled.

New claims 14–28 are added and determined to be patentable.

*14. A physically non-distributed microprocessor-based computer system comprising:*
   *a microprocessor;*
   *a random access memory device;*
   *a mass storage device;*
   *an input-output port device;*
   *said devices each being operable in conjunction with said microprocessor, said microprocessor and said devices each including an interface for receiving and transmitting data in packet form;*
   *a packet-based data channel extending between said microprocessor and said interfaces of said devices for providing simultaneous bi-directional communication between said microprocessor and said devices; and*
   *a first one of said interfaces including a first buffer for queuing packets for a transmission, and a second buffer for storing a copy of a packet transmitted by said first interface to a second one of said interfaces, said second buffer storing said copy pending receipt of a reply packet acknowledging receipt of said transmitted packet by said second interface.*

*15. A computer system as defined in claim 14 wherein said reply packet is a request echo packet.*

*16. A computer system as defined in claim 14 wherein said reply packet indicates said second interface did not accept said transmitted packet, and wherein upon receipt of said reply packet by said first interface said transmitted packet is retransmitted.*

*17. A computer system as defined in claim 14 wherein said buffer includes a memory location for storing said transmitted packet, said reply packet indicates said transmitted packet has been accepted by said second interface, and wherein upon receipt of said reply packet by said first interface said memory location is rendered capable of receiving new data.*

*18. A physically non-distributed microprocessor-based computer system comprising:*
   *a microprocessor;*
   *a random access memory device;*
   *a mass storage device;*
   *an input-output port device;*
   *said devices each being operable in conjunction with said microprocessor, said microprocessor and said devices comprising functional units each including an interface for receiving and transmitting data in packet form;*
   *a packet-based data channel extending between said microprocessor and said interfaces of said devices for providing simultaneous bi-directional communication between said microprocessor and said devices;*
   *one of said interfaces being associated with a first functional unit and including a linc cache for storing a quantity of data requested from another functional unit; and*
   *said linc cache comprising first and second memory blocks, said first memory block storing a first portion of said stored data comprising the data most recently requested, and said second memory block storing the balance of said stored data.*

*19. A physically non-distributed microprocessor-based computer system comprising:*
   *a microprocessor;*
   *a random access memory device;*
   *a mass storage device;*
   *an input-output port device;*
   *said devices each being operable in conjunction with said microprocessor, said microprocessor and said devices each including an interface for receiving and transmitting data in packet form;*
   *a packet-based data channel extending between said microprocessor and said interfaces of said devices for providing simultaneous bi-directional communication between said microprocessor and said devices;*
   *at least one of said interfaces transmitting an idle-type packet over said packet-based data channel to one or more of the other interfaces; and*
   *at least one of said other interfaces including a controller which upon receipt of said idle-type packet transmits a response-type packet over said data channel to said one interface.*

*20. A computer system as defined in claims 13, 14, 18, or 19 wherein at least one of said interfaces includes a parallel data/address bus circuit coupled to a functional unit associated with said one interface and a packet interface circuit coupled to said parallel data/address bus circuit and to said packet-based data channel.*

*21. A computer system as defined in claims 13, 14, 18, or 19 wherein at least one of said interfaces is integrated into a functional unit associated with said one interface.*

*22. A computer system as defined in claims 13, 14, 18, or 19 wherein said random access memory device is a system memory device.*

*23. A computer system as defined in claims 13, 14, 18, or 19 wherein said packet-based data channel is at least two bits wide.*

*24. A computer system as defined in claims 13, 14, 18, or 19 wherein said data channel includes switching means for selectively connecting said microprocessor to selected ones of said devices.*

*25. A computer system as defined in claim 24 wherein said switch means comprise a microprocessor controlled switch providing individual interconnection between said microprocessor and any one of said devices or between any two or more of said devices.*

*26. A computer system as defined in claim 24 wherein said switching means comprise a ring circuit connecting each of said interface circuits.*

27. A physically non-distributed microprocessor-based computer system comprising:
   a microproessor;
   a random access memory device;
   a mass storage device;
   an input-output port device;
   said devices each being operable in conjunction with said microprocessor, said microprocessor and said devices each including an interface for receiving and transmitting data in packet form;
   a packet-based data channel extending between said microprocessor and said interfaces of said devices for providing simultaneous bi-directional communication between said microprocessor and said devices; and
   a first one of said interfaces transmitting data in packet form to a second one of said interfaces, said first interface including a first buffer for queuing packets for transmission, and a second buffer for storing a copy of a packet transmitted from said first buffer, said second interface being adapted upon acceptance of said transmitted packet to transmit a reply packet acknowledging receipt of said transmmitted packet over said data channel to said first interface, said second buffer storing said copy pending receipt of said reply packet.

28. A physically non-distributed microprocessor-based computer system comprising:
   a microprocessor;
   a random access memory device;
   a mass storage device;
   an input-output port device;
   said devices each being operable in conjunction with said microprocessor, said microprocessor and said devices each including an interface for receiving and transmitting data in packet form;
   a packet-based data channel extending between said microprocessor and said interfaces of said devices for providing simultaneous bi-directional communication between said microprocessor and said devices; and
   a first one of said interfaces transmitting data in packet form to a second one of said interfaces, said first interface including a first buffer for queuing packets for transmission, and a second buffer for storing a copy of a packet transmitted from said first buffer, said second interface being adapted upon non-acceptance of said transmitted data to transmit a reply packet indicating said non-acceptance over said data channel to said first interface, said first interface transmitting said stored copy upon receipt of said reply packet.

* * * * *

(12) EX PARTE REEXAMINATION CERTIFICATE (9406th)
United States Patent
Kavipurapu

(10) Number: US 6,009,488 C2
(45) Certificate Issued: Nov. 13, 2012

(54) COMPUTER HAVING PACKET-BASED INTERCONNECT CHANNEL

(75) Inventor: Gautam Kavipurapu, Dallas, TX (US)

(73) Assignee: Microlinc, LLC, Chicago, IL (US)

Reexamination Request:
No. 90/009,376, Dec. 23, 2008

Reexamination Certificate for:
Patent No.: 6,009,488
Issued: Dec. 28, 1999
Appl. No.: 08/965,760
Filed: Nov. 7, 1997

Reexamination Certificate C1 6,009,488 issued Feb. 10, 2009

(51) Int. Cl.
*H04L 12/403* (2006.01)
*H04L 12/423* (2006.01)

(52) U.S. Cl. ............. 710/105; 710/3; 710/29; 710/30; 710/36; 710/240

(58) Field of Classification Search .............. None
See application file for complete search history.

(56) References Cited

To view the complete listing of prior art documents cited during the proceeding for Reexamination Control Number 90/009,376, please refer to the USPTO's public Patent Application Information Retrieval (PAIR) system under the Display References tab.

*Primary Examiner* — Woo H Choi

(57) ABSTRACT

A physically non-distributed microprocessor-based computer includes a microprocessor, and a random access memory device, a mass storage device, and an input-output port device, all operable from the microprocessor and including an interface for receiving and transmitting data in packet form. A novel packet-based data channel extends between the microprocessor and the interfaces of the devices to provide communication between the microprocessor and the devices. By varying the size of the packets in accordance with actual data transmission requirements improved computer performance is achieved.

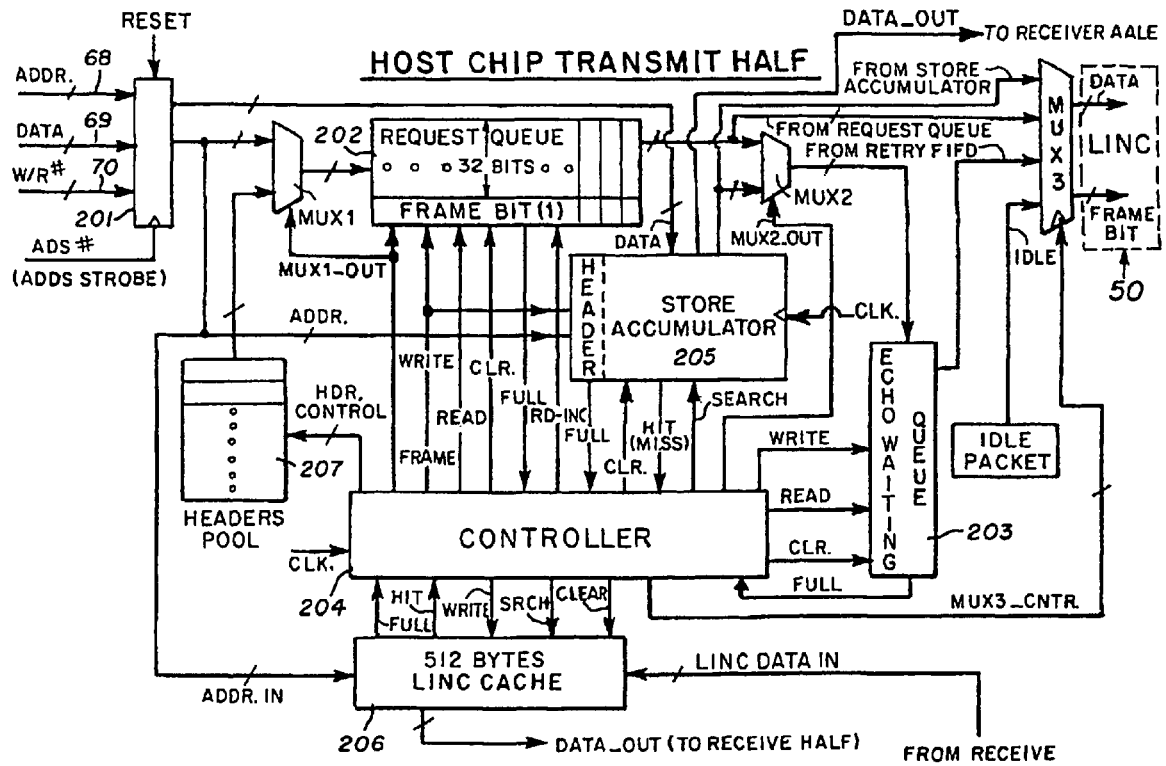

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 14-17 and 20-28 is confirmed.

Claims 1-12 were previously cancelled.

Claims 13, 18 and 19 are cancelled.

New claims 29-39 are added and determined to be patentable.

*29. A physically non-distributed microprocessor-based computer system comprising:*
*a microprocessor;*
*a random access memory device;*
*a mass storage device;*
*an input-output port device;*
*said devices each being operable in conjunction with said microprocessor, said microprocessor; and said devices each including an interface for receiving and transmitting data in packet form;*
*a packet-based data channel extending between the interfaces of said microprocessor and said devices for providing simultaneous bi-directional communication between said microprocessor and said devices;*
*a first one of said interfaces including a first buffer for queuing packets for transmission, and a second buffer for storing a copy of a packet transmitted by said first one of said interfaces to a second one of said interfaces, said second buffer storing said copy pending receipt of a reply packet acknowledging receipt of said transmitted packet by said second one of said interfaces; and*
*wherein said reply packet indicates said second one of said interfaces did not accept said transmitted packet, and wherein upon receipt of said reply packet by said first one of said interfaces said transmitted packet is retransmitted to said second one of said interfaces by said second buffer.*

*30. A computer system as defined in claim 29 wherein said reply packet is a request echo packet.*

*31. A physically non-distributed microprocessor-based computer system comprising:*
*a microprocessor;*
*a random access memory device;*
*a mass storage device;*
*an input-output port device;*
*said devices each being operable in conjunction with said microprocessor, said microprocessor and said devices each including an interface for receiving and transmitting data in packet form;*
*a packet-based data channel extending between the interfaces of said microprocessor and said devices for providing simultaneous bi-directional communication between said microprocessor and said devices;*
*a first one of said interfaces including a first buffer for queuing packets for transmission, and a second buffer for storing a copy of a packet transmitted by said first one of said interfaces to a second one of said interfaces, said second buffer storing said copy pending receipt of a reply packet acknowledging receipt of said transmitted packet by said second one of said interfaces; and*
*wherein said second buffer includes a memory location for storing said transmitted packet, said reply packet indicates said transmitted packet has been accepted by said second one of said interfaces, and wherein upon receipt of said reply packet by said first one of said interfaces said memory location is rendered capable of receiving new data.*

*32. A physically non-distributed microprocessor-based computer system comprising;*
*a microprocessor;*
*a random access memory device;*
*a mass storage device;*
*an input-output port device;*
*said devices each being operable in conjunction with said microprocessor, said microprocessor and said devices each including an interface for receiving and transmitting data in packet form;*
*a packet-based data channel extending between the interfaces of said microprocessor and said devices for providing simultaneous bi-directional communication between said microprocessor and said devices;*
*said microprocessor interface including a line cache for storing a quantity of data requested from one of said devices; and*
*said line cache comprising first and second memory blocks, said first memory block storing a first portion of said stored data comprising the data most recently requested, and said second memory block storing the balance of said stored data.*

*33. A physically non-distributed microprocessor-based computer system comprising:*
*a microprocessor;*
*a random access memory device;*
*a mass storage device;*
*an input-output port device;*
*said devices each being operable in conjunction with said microprocessor, said microprocessor and said devices each including an interface for receiving and transmitting data in packet form;*
*a packet-based data channel extending between the interfaces of said microprocessor and said devices, said packet-based data channel providing simultaneous bi-directional communication between said microprocessor and said devices;*
*said microprocessor interface including a controller, said controller accepting data and a physical address from said microprocessor, said physical address identifying a particular physical address within one of said devices; and*
*said controller transmitting a packet including said physical address and said data over said packet-based data channel to the interface of said one device.*

*34. A physically non-distributed microprocessor-based computer system comprising:*
*a microprocessor incorporating a translation lookaside buffer storing virtual address to physical address translations for a plurality of virtual addresses;*
*a random access memory device;*
*a mass storage device;*
*an input-output port device;* said devices each being operable in conjunction with said microprocessor, said microprocessor and said devices each including an interface for receiving and transmitting data in packet form;

a packet-based data channel extending between the interfaces of said microprocessor and said devices, said packet-based data channel providing simultaneous bi-directional communication between said microprocessor and said devices;

said microprocessor interface including a controller, said controller accepting data and a virtual address from said microprocessor, said controller accessing said translation lookaside buffer and receiving a physical address corresponding to said virtual address, said physical address identifying a particular physical address within one of said devices; and said controller transmitting a packet including said physical address and said data to the interface of said one device.

35. A physically non-distributed microprocessor-based computer system comprising:

a microprocessor;

a random access memory device;

a mass storage device;

an input-output port device;

said devices each being operable in conjunction with said microprocessor, said microprocessor and said devices each including an interface for receiving and transmitting data in packet form;

a packet-based data channel extending between the interfaces of said microprocessor and said devices for providing simultaneous bi-directional communication between said microprocessor and said devices;

said microprocessor interface including a cache for storing a quantity of data requested from one of said devices; and said cache being organized with a variable line size adjusted dynamically based on changes in hit rate.

36. A computer system as defined in claims 29, and 32-35 wherein said interface of said microprocessor includes a parallel data/address bus circuit coupled to said microprocessor and a packet interface circuit coupled to said packet-based data channel.

37. A computer system as defined in claims 29 and 32-35 wherein said interface of said microprocessor is integrated into said microprocessor.

38. A computer system as defined in claims 29 and 32-35 wherein said random access memory device is a system memory device.

39. A computer system as defined in claims 29 and 32-35 wherein said packet-based data channel is at least two bits wide.

* * * * *